United States Patent
Komuro et al.

(10) Patent No.: US 12,246,920 B2
(45) Date of Patent: Mar. 11, 2025

(54) TRAY TRANSPORT APPARATUS AND TRANSFER SYSTEM

(71) Applicant: HIRATA CORPORATION, Kumamoto (JP)

(72) Inventors: Shuichi Komuro, Kumamoto (JP); Yoichi Hirasawa, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 0 days.

(21) Appl. No.: 18/773,843

(22) Filed: Jul. 16, 2024

(65) Prior Publication Data
US 2024/0367909 A1 Nov. 7, 2024

Related U.S. Application Data

(63) Continuation of application No. PCT/JP2022/010335, filed on Mar. 9, 2022.

(51) Int. Cl.
| | |
|---|---|
| *B65G 1/14* | (2006.01) |
| *B65G 35/06* | (2006.01) |
| *B65G 57/30* | (2006.01) |
| *B65G 60/00* | (2006.01) |

(52) U.S. Cl.
CPC .............. *B65G 1/14* (2013.01); *B65G 35/06* (2013.01); *B65G 57/303* (2013.01); *B65G 60/00* (2013.01)

(58) Field of Classification Search
CPC ........ B65G 1/14; B65G 35/06; B65G 57/303; B65G 60/00
See application file for complete search history.

(56) References Cited

U.S. PATENT DOCUMENTS

| | | | |
|---|---|---|---|
| 5,180,277 A * | 1/1993 | Pearce | B65B 5/068 |
| | | | 414/792.7 |
| 10,106,336 B2 * | 10/2018 | Hirasawa | B65G 37/00 |

(Continued)

FOREIGN PATENT DOCUMENTS

| | | |
|---|---|---|
| JP | S62150900 A | 7/1987 |
| JP | H058130 A | 1/1993 |

(Continued)

OTHER PUBLICATIONS

International Search Report (PCT/ISA/210) w/ translation & Written Opinion (PCT/ISA/237) mailed on May 17, 2022, by the Japanese Patent Office in International Application No. PCT/JP2022/010335. (8 pages).

(Continued)

*Primary Examiner* — Thomas Randazzo
(74) *Attorney, Agent, or Firm* — Buchanan Ingersoll & Rooney PC

(57) ABSTRACT

A tray transport apparatus comprises a reception portion configured to receive a container configured to accommodate a stack formed by stacking a plurality of trays, an accommodation portion configured to accommodate the stack, the accommodation portion being disposed above the reception portion, a transfer unit configured to lift the stack from the container to separate the stack from the container and transfer the stack to the accommodation portion, and a transport unit configured to unload a tray located at a lowermost portion of the stack accommodated in the accommodation portion.

21 Claims, 27 Drawing Sheets

(56) References Cited

U.S. PATENT DOCUMENTS

| | | | | |
|---|---|---|---|---|
| 2009/0148261 A1* | 6/2009 | Hirasawa | ........... | G01R 31/2893 |
| | | | | 414/277 |
| 2013/0259628 A1* | 10/2013 | Hirasawa | ............ | H01L 21/6773 |
| | | | | 414/754 |
| 2014/0093338 A1* | 4/2014 | Mestrallet | .............. | B65G 49/00 |
| | | | | 414/265 |
| 2015/0291371 A1 | 10/2015 | Hirasawa et al. | | |
| 2020/0079602 A1 | 3/2020 | Kihlström | | |

FOREIGN PATENT DOCUMENTS

| | | | | | |
|---|---|---|---|---|---|
| JP | H0717602 | A | | 1/1995 | |
| JP | H08301450 | A | | 11/1996 | |
| JP | 2003262659 | A | * | 9/2003 | ............. H01L 21/68 |
| JP | 2019038621 | A | | 3/2019 | |
| JP | 2019089619 | A | * | 6/2019 | .............. B65G 1/00 |
| JP | 2019202890 | A | | 11/2019 | |
| WO | 2007026433 | A1 | | 3/2007 | |
| WO | 2014102856 | A1 | | 7/2014 | |

OTHER PUBLICATIONS

International Preliminary Report on Patentability (PCT/IPEA/409) mailed on Nov. 13, 2023, by the Japanese Patent Office in International Application No. PCT/JP2022/010335. (21 pages).
English translation of International Preliminary Report on Patentability (PCT/IPEA/409) mailed on Sep. 12, 2024 (6 pages).

* cited by examiner

TRAY TRANSPORT APPARATUS AND TRANSFER SYSTEM

CROSS-REFERENCE TO RELATED APPLICATION(S)

This application is a Continuation of International Patent Application No. PCT/JP2022/010335, filed Mar. 9, 2022, the entire disclosures of which is incorporated herein by reference.

BACKGROUND OF THE INVENTION

Field of the Invention

The present invention relates to a tray transport technique.

Description of the Related Art

A transport technique using a tray for transporting relatively small works such as electronic components is known (WO 2014/102856 A, Japanese Patent Laid-Open No. 2019-038621, Japanese Patent Laid-Open No. H8-301450). A plurality of works are placed on one tray, and inspection and the like of individual work can be performed in units of trays. In addition, it is also possible to transfer the works between trays such that a specific work group is placed on one tray according to the quality of the work or the request of the delivery destination. Japanese Patent Laid-Open No. 2019-202890 discloses a technique of collecting a stack of a plurality of trays for meals using a cart.

As in the cart of Japanese Patent Laid-Open No. 2019-202890, a system in which a plurality of trays are accommodated using a container is advantageous in that a plurality of trays can be transported together by one container. However, in the technique of Japanese Patent Laid-Open No. 2019-202890, there is room for improvement in terms of efficiency of replacement of containers.

SUMMARY OF THE INVENTION

An object of the present invention is to efficiently replace a container in which a stack of trays is to be accommodated.

According to one aspect of the present invention, a tray transport apparatus comprising: a reception portion configured to receive a container configured to accommodate a stack formed by stacking a plurality of trays; an accommodation portion configured to accommodate the stack, the accommodation portion being disposed above the reception portion; a transfer unit configured to lift the stack from the container to separate the stack from the container and transfer the stack to the accommodation portion; and a transport unit configured to unload a tray located at a lowermost portion of the stack accommodated in the accommodation portion.

Further features of the present invention will become apparent from the following description of exemplary embodiments (with reference to the attached drawings).

DESCRIPTION OF THE EMBODIMENTS

Figure 1:
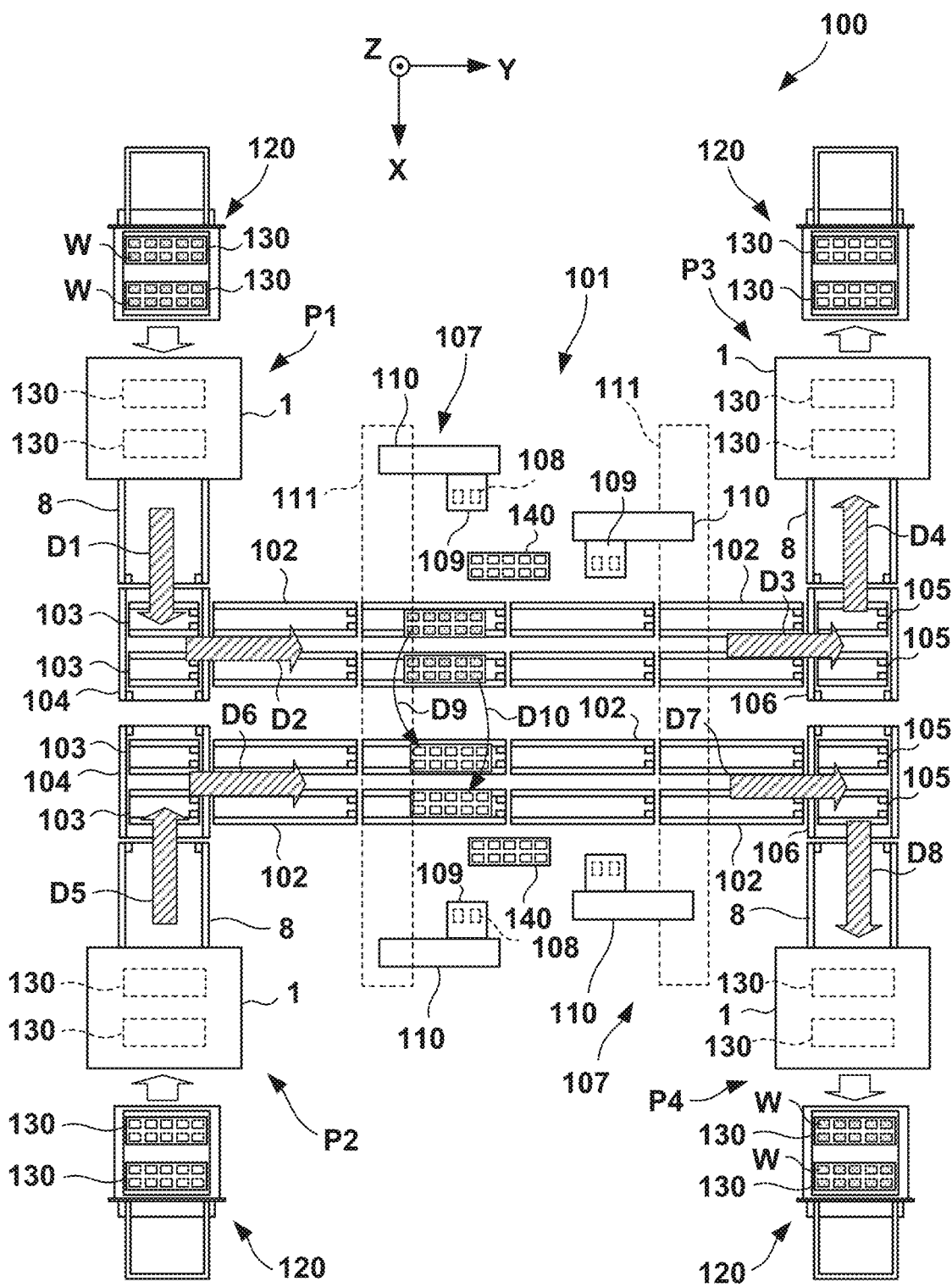
FIG. 1 is a layout diagram of a transfer system according to an embodiment of the present invention.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

<Transfer System>

FIG. 1 is a layout diagram of a transfer system 100 according to an embodiment of the present invention. In the drawing, arrows X and Y indicate horizontal directions orthogonal to each other, and arrow Z indicates an up-down direction. The transfer system 100 is a replacement system that transfers a work W between a tray 130 on which the work W is placed and an empty tray 130. The work W is, for example, an electronic component such as a processor. As an application of the transfer system 100, for example, a defective work W is removed from the tray 130 that supports works W, and only a non-defective work W is transferred to the empty tray 130. Alternatively, for example, only a specific type of work W is transferred from the tray 130 that supports a plurality of types of works W to the empty tray 130, and the tray 130 is sorted for each type of work W.

In the present embodiment, the tray 130 is supplied to the transfer system 100 using a cart 120, and the tray 130 is collected using the cart 120. A plurality of trays 130 can be loaded on the cart 120.

The transfer system 100 includes a work transfer apparatus 101 and a plurality of tray transport apparatus 1. The work transfer apparatus 101 includes two pairs of a group of conveyors 102 disposed in two rows continuously in the Y direction. Thus, the group of conveyors 102 are provided in four rows in total.

Two conveyors 103 capable of transporting the tray 130 in the Y direction and lifting and lowering the tray 130 in the Z direction and a conveyor 104 that transports the tray 130 in the X direction are disposed at one end portion in the Y direction (an end portion on an upstream side in the transport direction) of the group of conveyors 102 disposed in two rows. The conveyor 102 and the conveyor 104 have different transport heights, and the two conveyors 103 transport the tray 130 from the conveyor 104 to the conveyor 102 while coping with the difference in transport height between the conveyor 102 and the conveyor 104. The direction of the tray 130 with respect to the transport direction is changed.

Two conveyors 105 capable of transporting the tray 130 in the Y direction and lifting and lowering the tray 130 in the Z direction and a conveyor 106 that transports the tray 130 in the X direction are disposed at the other end portion in the Y direction (an end portion on a downstream side in the transport direction) of the group of conveyors 102 disposed in two rows. The conveyor 102 and the conveyor 106 have different transport heights, and the two conveyors 105 transport the tray 130 from the conveyor 104 to the conveyor 102 while coping with the difference in transport height between the conveyor 102 and the conveyor 106. The direction of the tray 130 with respect to the transport direction is changed.

In the present embodiment, each of the conveyors 102 to 106 is a belt conveyor and transfers the tray 130 placed on the belt. However, another transport mechanism such as a roller conveyor may be used as the conveyors 102 to 106.

The work transfer apparatus 101 also includes two gate-shaped transfer robots 107. The transfer robot 107 transfers the work W between the trays 130 on the conveyors 102 in different rows. Each transfer robot 107 includes a holding portion 108 that holds the work W, a lifting unit 109 that lifts and lowers the holding portion 108 in the Z direction, a moving unit 110 that reciprocates the lifting unit 109 in the Y direction, and a moving unit 111 that crosses above the group of conveyors 102 in four rows in the X direction and reciprocates the moving unit 110 in the X direction. The holding portion 108 is, for example, a unit that sucks the work W. The transfer robot 107 transfers the work W between the trays 130 while recognizing the tray 130 and the work W on the tray 130 from an image captured by a camera.

The transfer system 100 includes the tray transport apparatuses 1 disposed in tray supply areas P1 and P2 and tray collection areas P3 and P4, respectively. The tray transport apparatus 1 is an apparatus that takes out and unloads the trays 130 one by one from one stack including a plurality of trays 130, or sequentially stacks the trays 130 to form a stack, and places the stack onto the cart 120.

The tray supply area P1 is an area where the tray 130 on which the work W is placed is loaded to the work transfer apparatus 101. The tray supply area P2 is an area where an empty tray 130 on which the work W is not placed is loaded to the work transfer apparatus 101. The tray transport apparatus 1 disposed in the tray supply area P1 can also be referred to as a work supply apparatus in that the tray 130 that supports the work W is supplied to the work transfer apparatus 101. The tray transport apparatus 1 disposed in the tray supply area P2 can also be referred to as a tray supply apparatus in that the empty tray 130 that does not support the work W is supplied to the work transfer apparatus 101.

The tray collection area P3 is an area for collecting the tray 130 loaded to the tray supply area P1 from which the work W has been transferred to another tray 130. The tray collection area P4 is an area for collecting the tray 130 loaded to the tray supply area P2 to which the work W has been transferred from another tray 130. The tray transport apparatus 1 disposed in the tray collection area P4 can also be referred to as a work collection apparatus in that the tray 130 that supports the work W is collected from the work transfer apparatus 101. The tray transport apparatus 1 disposed in the tray collection area P3 can also be referred to as a tray collection apparatus in that the empty tray 130 that does not support the work W is collected from the work transfer apparatus 101.

In this manner, in the present embodiment, the tray 130 supporting the work W, the tray having been supplied to the tray supply area P1 becomes an empty tray 130 and is collected in the tray collection area P3. The empty tray 130 supplied to the tray supply area P2 is loaded with the work W and collected in the tray collection area P4.

An operation example of the transfer system 100 will be described. A stack of a plurality of trays 130 supporting the work W is supplied to the tray supply area P1 by using the cart 120. In the tray supply area P1, the tray transport apparatus 1 separates a tray 130 from the stack of trays 130 and supplies the tray from a relay unit 8 to the conveyor 104 as indicated by the arrow D1. In the case of the present embodiment, the cart 120 accommodates two stacks of the trays 130, and the tray transport apparatus 1 simultaneously supplies a total of two trays 130 to the conveyor 104 one by one from one stack. Thereafter, the two trays 130 are transported as a pair of trays 130. The pair of trays 130 supplied to the conveyor 104 is transferred to the group conveyors 102 in two rows as indicated by the arrow D2 by the two conveyors 103. As a result, the trays 130 supporting the work W are supplied to the group of conveyors 102 in two rows on the upper side which is one side in FIG. 1.

On the other hand, a stack of a plurality of empty trays 130 not supporting the work W is supplied to the tray supply area P2 by using the cart 120. In the tray supply area P2, the tray transport apparatus 1 separates a tray 130 from the stack of trays 130 and supplies the tray from the relay unit 8 to the conveyor 104 as indicated by the arrow D5. The pair of trays 130 supplied to the conveyor 104 is transferred to the group of conveyors 102 in two rows as indicated by the arrow D6 by the two conveyors 103. As a result, the trays 130 not supporting the work W are supplied to the group of conveyors 102 in two rows on the lower side which is the other side in FIG. 1.

On the groups of conveyors 102 in four rows, two transfer robots 107 transfer the work W between different trays 130. The transfer robot 107 transfers the work W from the tray 130 on the group of conveyors 102 in two rows on the upper side in FIG. 1 to the empty tray 130 on the group of conveyors 102 in two rows on the lower side as indicated by the arrows D9 and D10. The transfer robot 107 can also transfer a defective work W or an inspection work W to a storage tray 140 disposed on the side of the groups of conveyors 102 in four rows.

As indicated by the arrow D3, the empty tray 130 on the group of conveyors 102 in two rows on the upper side in FIG. 1 is transported to the conveyor 105 and transferred to the conveyor 106 by the lifting operation of the conveyor 105. Then, as indicated by the arrow D4, the tray is taken into the tray transport apparatus 1 at the tray collection area P3 from the relay unit 8, and a stack of trays 130 is formed. Thereafter, the stack of trays 130 is transferred to the cart 120 in the tray transport apparatus 1, and the cart 120 is taken out to the outside.

The tray 130 supporting the work W on the group of conveyors 102 in two rows on the lower side in FIG. 1 is transported to the conveyor 105 as indicated by the arrow D7, and is transferred to the conveyor 106 by the lifting operation of the conveyor 105. Then, as indicated by the arrow D8, the tray is taken into the tray transport apparatus 1 at the tray collection area P4 from the relay unit 8, and a stack of trays 130 is formed. Thereafter, the stack of trays 130 is transferred to the cart 120 in the tray transport apparatus 1, and the cart 120 is taken out to the outside.

With such an operation, in the transfer system 100 of the present embodiment, it is possible to continuously perform the replacement of the work W between a plurality of trays 130 supporting the work W and a plurality of empty trays 130.

<Cart and Tray>

Figure 2:
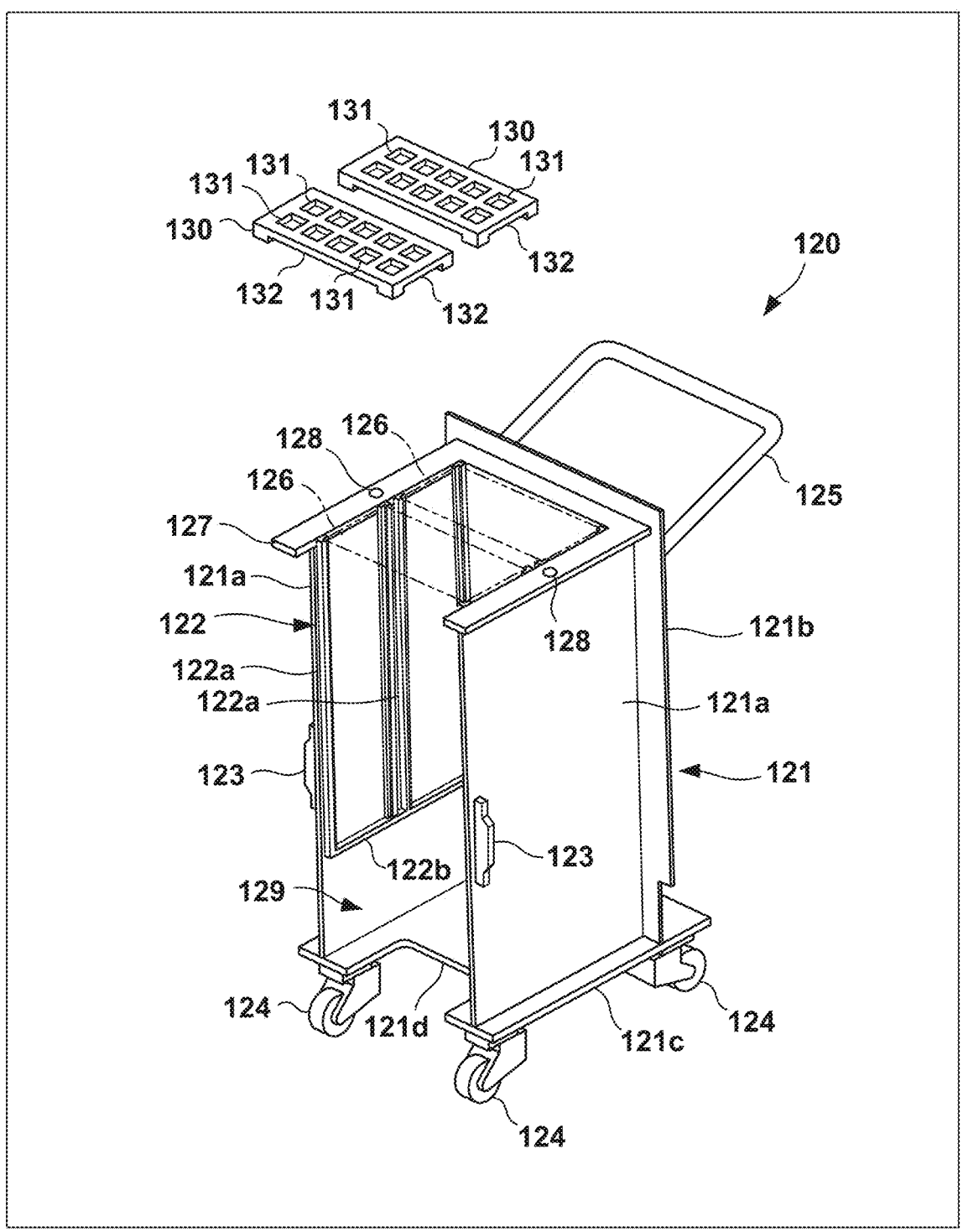
FIG. 2 is a perspective view of a cart used in the transfer system of FIG. 1.
Figure 3:
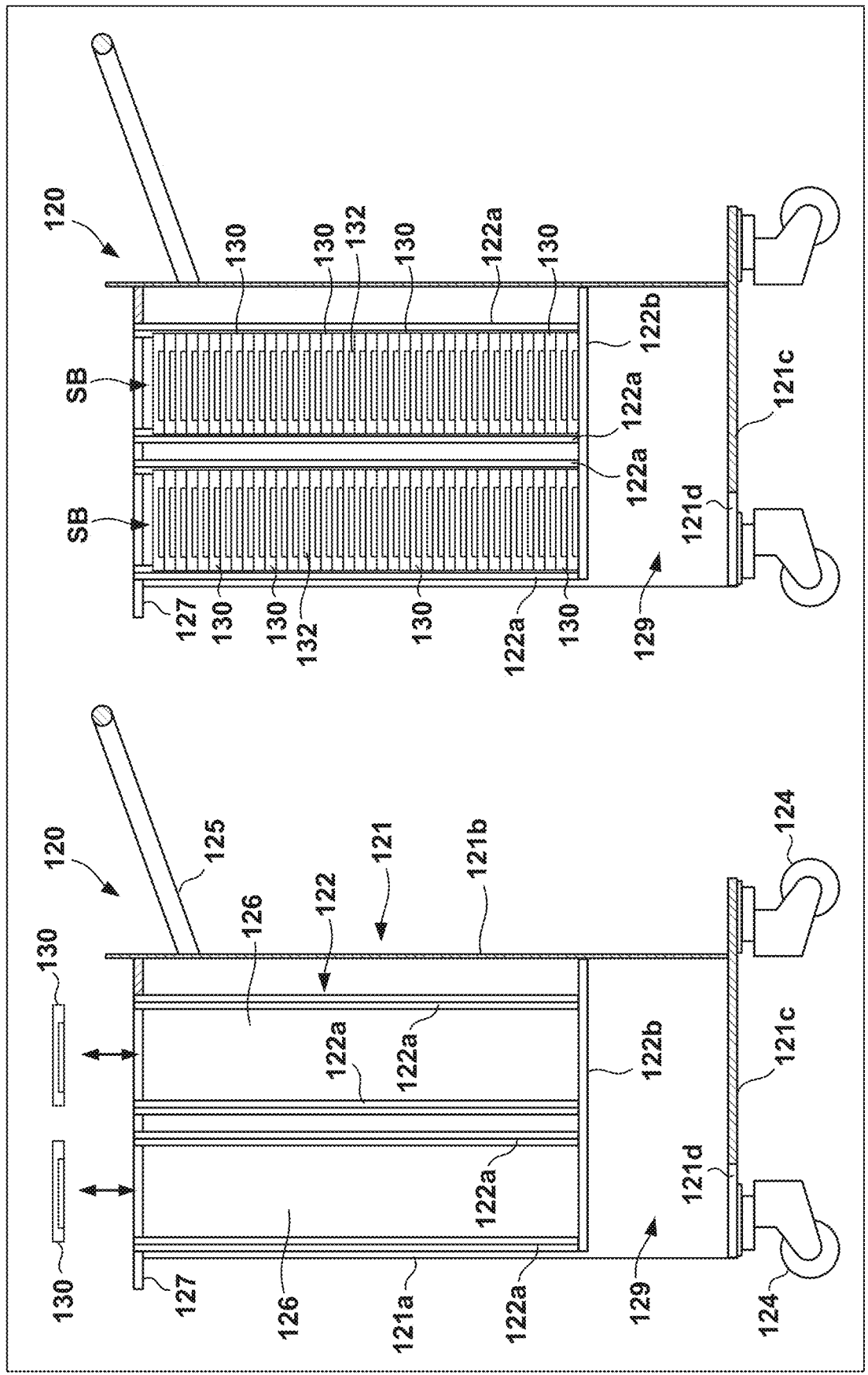
FIG. 3 is a view illustrating a tray accommodation mode in the cart of FIG. 2.

Structures of the cart 120 and the tray 130 will be described with reference to FIGS. 2 and 3. FIG. 2 is a perspective view of the cart 120 and the tray 130. FIG. 3 is a sectional view illustrating the internal structure of the cart 120, which illustrates an empty state in which the tray 130 is not accommodated and a state in which the tray 130 is accommodated.

The tray 130 has a thin rectangular parallelepiped shape as a whole, and a plurality of recesses 131 for supporting the work W are formed on an upper surface of the tray. One work W is placed in each recess 131. A stepped portion 132 is formed on a bottom surface of the tray 130. When trays 130 are stacked in the Z direction, the stepped portion 132 can form a gap between upper and lower trays 130. Utilizing this gap makes it possible to perform separation and the like of the stacked trays 130. Although not illustrated, the tray 130 is formed with an engagement portion (for example, a protrusion and a groove) with which the trays 130 are engaged when stacked vertically. When upper and lower trays 130 are engaged with each other, the stacked state can be maintained when a plurality of trays 130 are stacked.

The cart 120 includes a container 121. The container 121 accommodates a stack SB of trays 130. The container 121 of the present embodiment includes two accommodation portions 126 of the stack SB, and can accommodate two stacks SB side by side. The two stacks SB of the present embodiment can be accommodated in the container 121 one by one by being arranged in a front-rear direction which is a direction in which the cart 120 to be taken in and out of the tray transport apparatus 1 is taken in and out.

The container 121 includes left and right side plates 121a, a back plate 121b, and a bottom plate 121c, and the container is formed in a box shape. A cutout 121d is formed in a front portion of the bottom plate 121c. The container 121 has a front portion and a top portion opened. The top portion of the container 121 is provided with a rectangular flange portion 127 surrounding three sides except for the front side of the open space, and an engagement portion 128 for positioning is formed in the flange portion 127. In the present embodiment, the engagement portion 128 is a through hole penetrating the flange portion 127 in a thickness direction. The engagement portions 128 are provided one by one in the left-right direction of the flange portion 127. In the cart 120, the engagement portion 128 provided in the flange portion 127 is engaged with a positioning member 70 included in a positioning unit 7 of the tray transport apparatus 1 to be described later, whereby the container 121 is positioned, and the attachment of the cart 120 is completed.

Four casters 124 are attached to the bottom plate 121c, and a handle 125 is attached to the back plate 121b. In this manner, the cart 120 of the present embodiment has the form of a hand cart that can be manually moved by a worker. However, instead of the form of the cart, a configuration of only the container 121 can also be adopted, and in this case, the container 121 may be transported by a robot.

A support frame 122 for supporting the stack SB is fixed to each inner surface of the left and right side plates 121a. The support frame 122 includes a plurality of guide members 122a and a placement member 122b that couples lower end portions of the guide members 122a. Each guide member 122a is a rail member having an L-shaped horizontal section extending in the Z direction, and one support frame 122 has four guide members 122a disposed in parallel. The pair of guide members 122a guides the corresponding corner portions at the time of up-down movement of the stack, and one side of the plurality of trays 130 forming one stack SB is disposed between them.

The placement member 122b is a member on which the stack SB is placed, the placement member supporting a bottom portion of the stack SB. One stack SB is suspended and placed on each of the placement members 122b (two placement members 122b in total) of the left and right side plates 121a, and its downward movement is restricted. The placement member 122b is disposed at a position separated from the bottom plate 121c in the Z direction, and a bottom space 129 is formed between the lowermost tray 130 of the stack SB placed on the placement member 122b and the bottom plate 121c. The cutout 121d is formed in a front portion of the bottom plate 121c. The bottom space 129 receives a placement portion 30a of a lifting table 30 described later up to a position facing the lower side of the stack SB. The cutout 121d enables the container 121 to avoid interference with the pair of support members 32 of the lifting table 30. Since the bottom space 129 and the cutout 121d are formed, it is possible to receive the cart 120 (container 121) into a reception portion 10 while avoiding interference between the cart 120 (container 121) and the transfer unit 3.

An abutment member 123 is provided on each outer surface of the left and right side plates 121a. The abutment member 123 is a plate-like member protruding outward from the side plate 121a, and is a member for positioning when the cart 120 is mounted at a cart mounting preparation position of the tray transport apparatus 1.

<Tray Transport Apparatus>

A configuration of the tray transport apparatus 1 will be described with reference to the drawings. In the case of the present embodiment, the four tray transport apparatuses 1 of the transfer system 100 have the same configuration. However, the four tray transport apparatuses 1 face different directions. Thus, the directions of X, Y, and Z will be described with reference to the direction of the tray transport apparatus 1 disposed in the tray supply area P1 for convenience.

Figure 4:
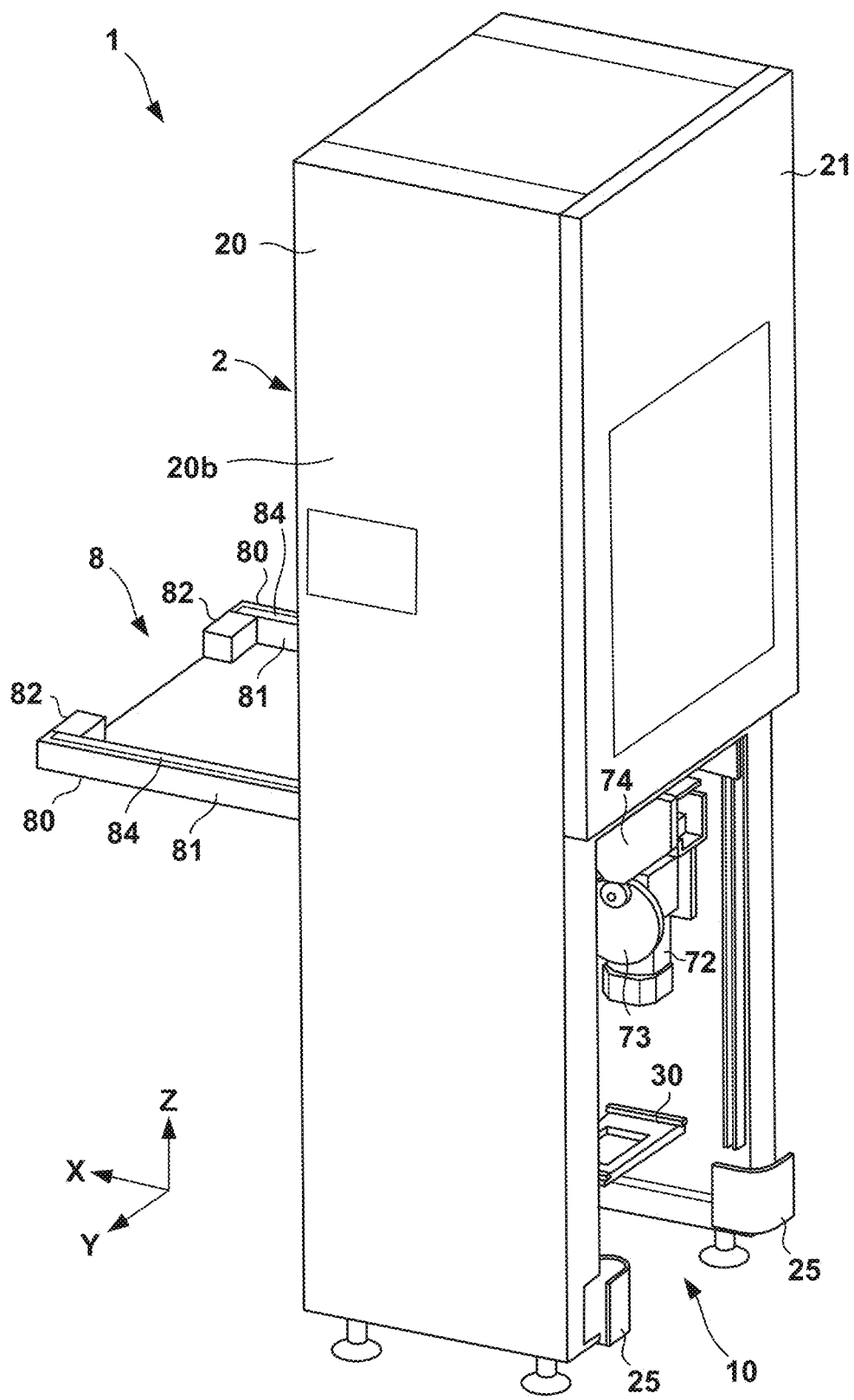
FIG. 4 is a perspective view of a tray transport apparatus.

FIG. 4 is a perspective view of the tray transport apparatus 1. The tray transport apparatus 1 includes a housing 2, and a basic configuration of the apparatus is accommodated in the housing 2. The tray transport apparatus 1 also includes the relay unit 8 disposed outside the housing 2 at the back of the housing 2. The relay unit 8 relays and transports the tray 130 to be unloaded from the transport unit 4 in the housing 2, and relays and transports the tray 130 to the transport unit 4 in the housing 2.

The housing 2 has a box shape as a whole, including a main body 20 and a front cover 21 covering an upper portion of a front surface of the main body 20. The main body 20 includes a back wall 20a and left and right side walls 20b.

Figure 5:
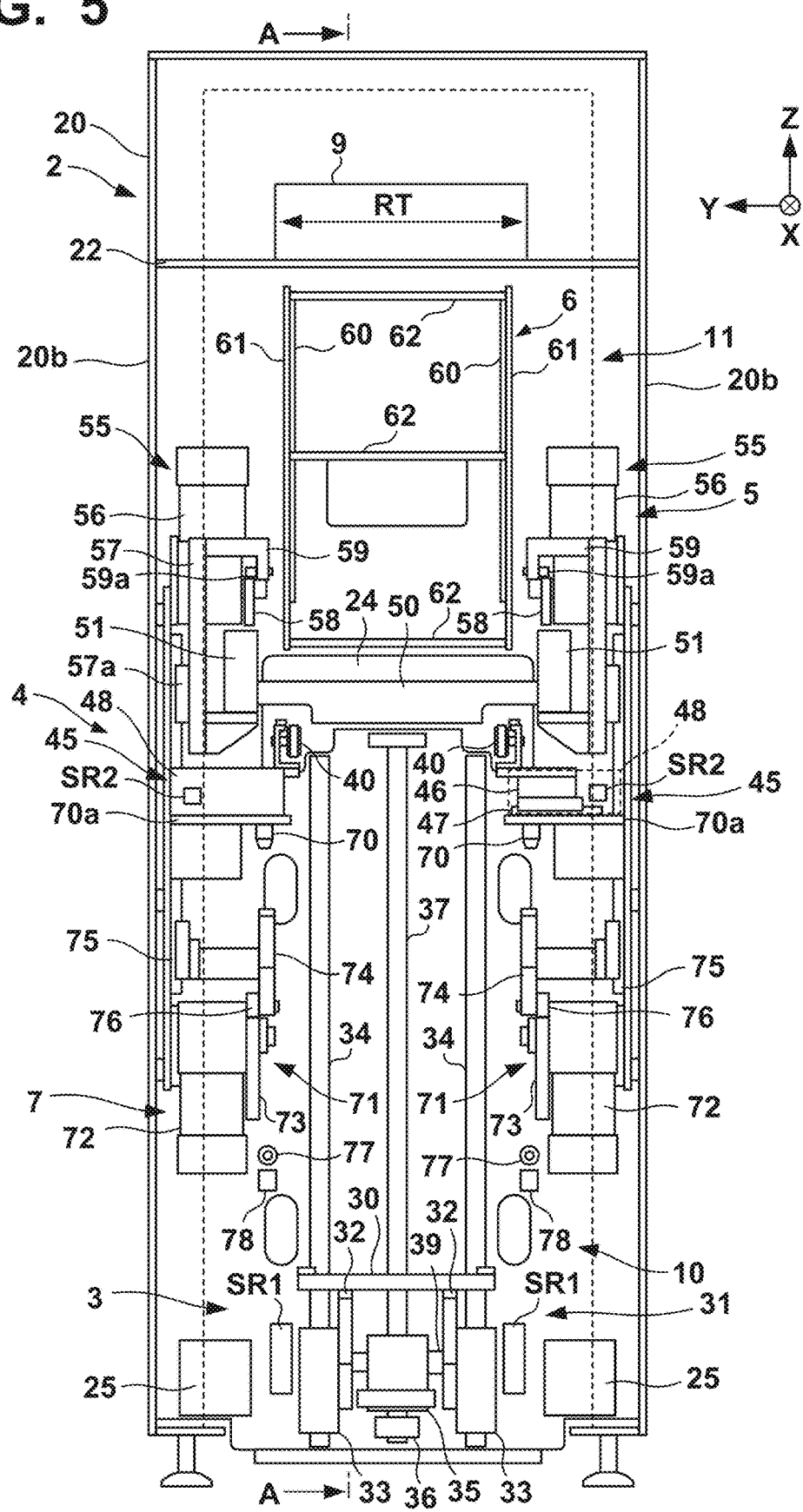
FIG. 5 is a front view of the tray transport apparatus of FIG. 4.
Figure 6:
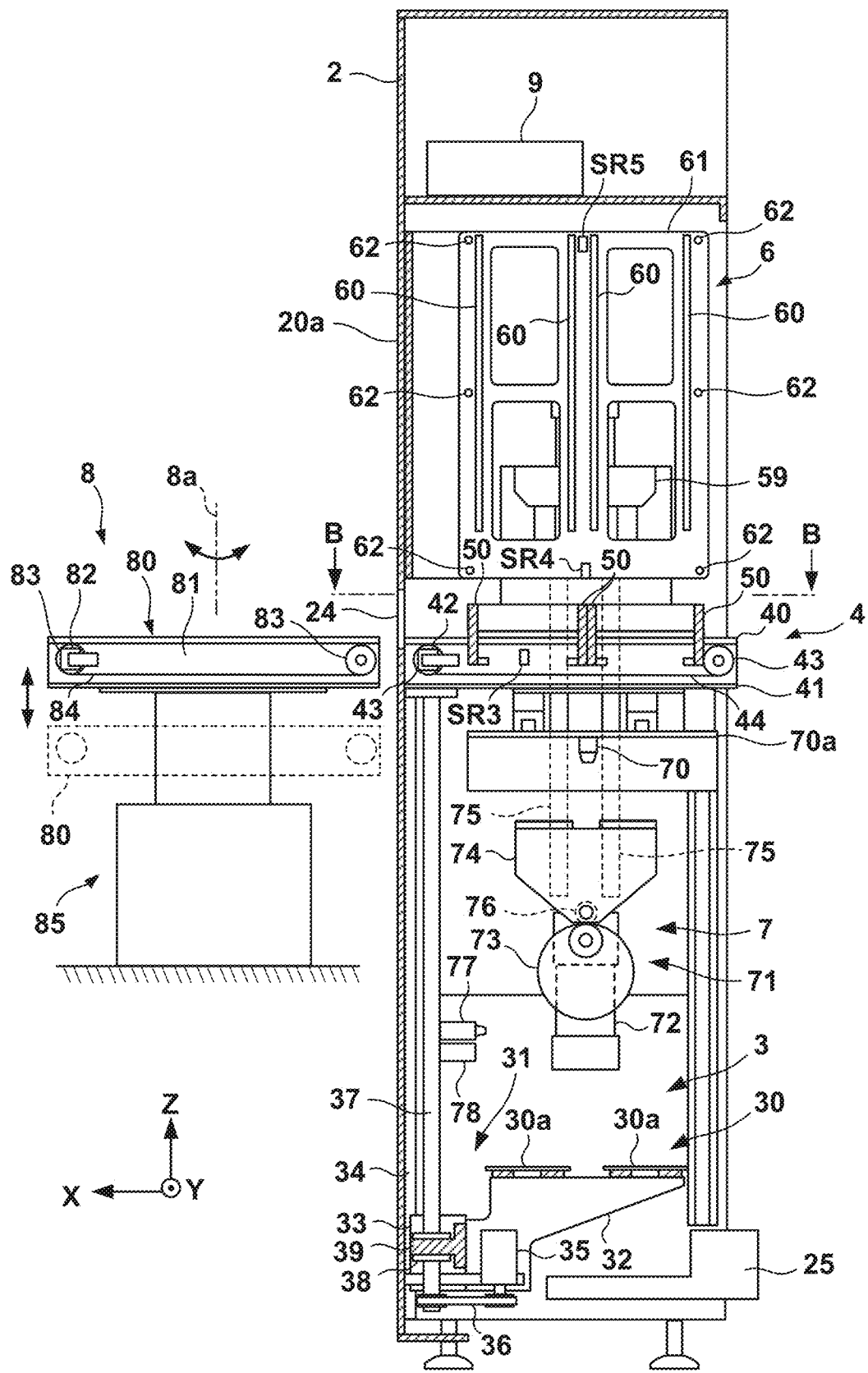
FIG. 6 is a side view of an internal configuration of the tray transport apparatus of FIG. 4.
Figure 7:
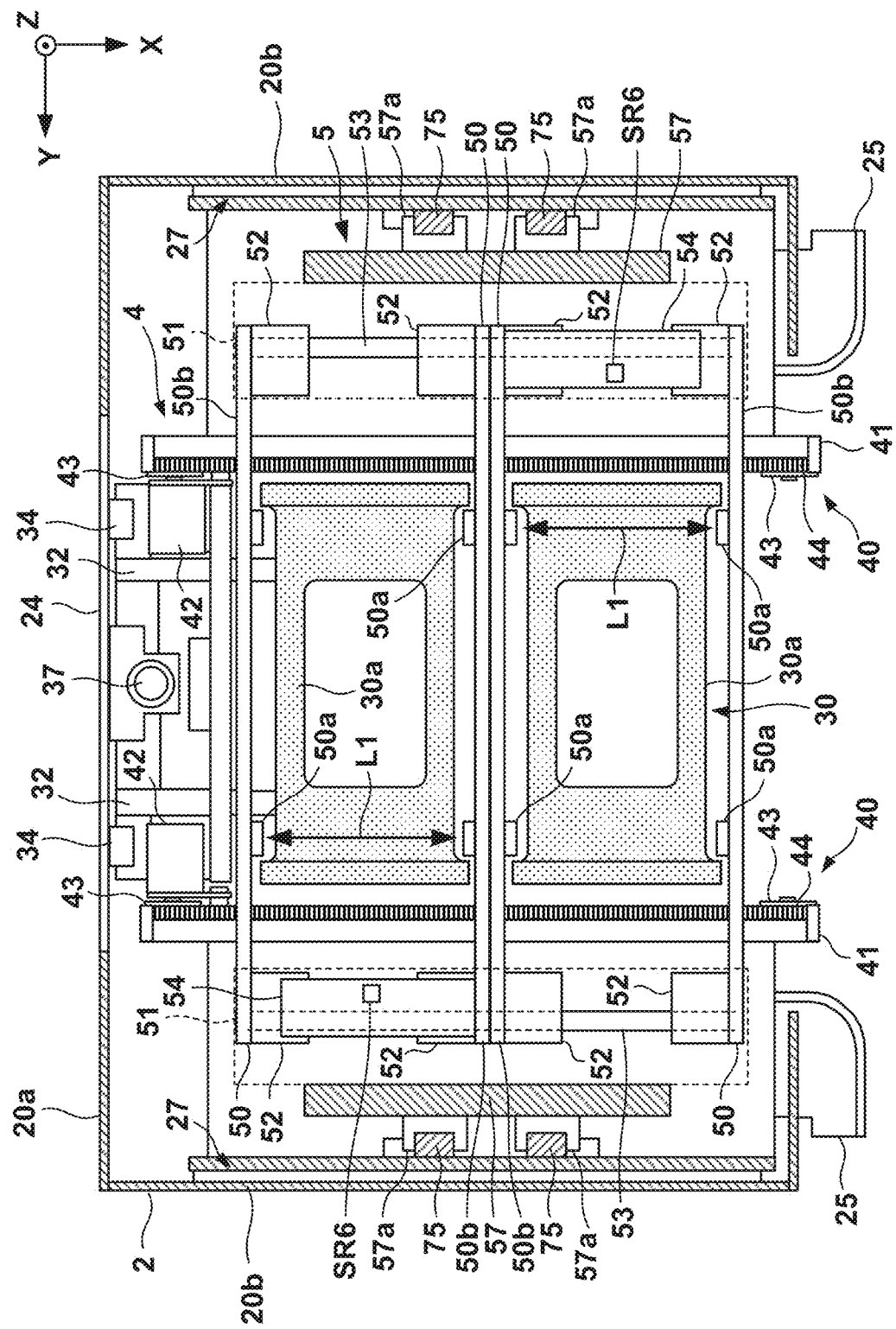
FIG. 7 is a sectional view of the tray transport apparatus taken along the line B-B in FIG. 6.

FIG. 5 is a view illustrating the internal configuration of the housing 2, which is a front view of the internal configuration of the housing 2 as viewed from the front side of the main body 20 with the front cover 21 and the like removed. FIG. 6 is a sectional view taken along the line A-A in FIG. 5, which is a side view schematically illustrating the internal configuration of the housing 2. FIG. 7 is a sectional view taken along the line B-B in FIG. 6, which is a plan view schematically illustrating the internal configuration of the housing.

The configuration of the tray transport apparatus 1 will be described with reference to FIG. 8 which is a perspective view of the main body 20 and FIGS. 9 to 11 which are operation explanatory diagram as appropriate while mainly referring to FIGS. 4 to 7.

<Reception Portion and Accommodation Portion>

A reception portion 10 in which a space for receiving the cart 120 (container 121) is formed is provided in a lower portion inside the housing 2, and the housing 2 is open at the front surface of the reception portion 10. At a lower end portion of the side walls 20b of the main body 20, a pair of guide members 25 for guiding the cart 120 to be received with respect to the reception portion 10 is provided. The guide member 25 has a guide surface curved in an arc shape, and it guides the cart 120 to be received by the reception portion 10 to an appropriate position in the left-right direction (Y direction). The reception portion 10 is provided with a sensor SR1 that detects the reception of the cart 120. The sensor SR1 is, for example, a contact sensor or an optical sensor, and it detects that the cart 120 is received by the reception portion 10.

An upper portion of the housing 2 is provided with an accommodation portion 11 which is disposed above the reception portion 10 and in which a space capable of accommodating the stack SB is formed. The accommodation space of the accommodation portion 11 is surrounded by the main body 20 and the front cover 21.

When supplying the tray 130 to the work transfer apparatus 101, the tray transport apparatus 1 separates the stack SB from the container 121 of the cart 120 received by the reception portion 10, transfers the stack SB to the accommodation portion 11, and then unloads the trays 130 one by one from the tray 130 at the lower end of the stack SB to the outside. When the tray 130 is collected from the work transfer apparatus 101, the tray 130 is sequentially accommodated in the accommodation portion 11 to form the stack SB, and then the stack SB is transferred from the accommodation portion 11 to the container 121 of the cart 120 received by the reception portion 10.

Figure 8:
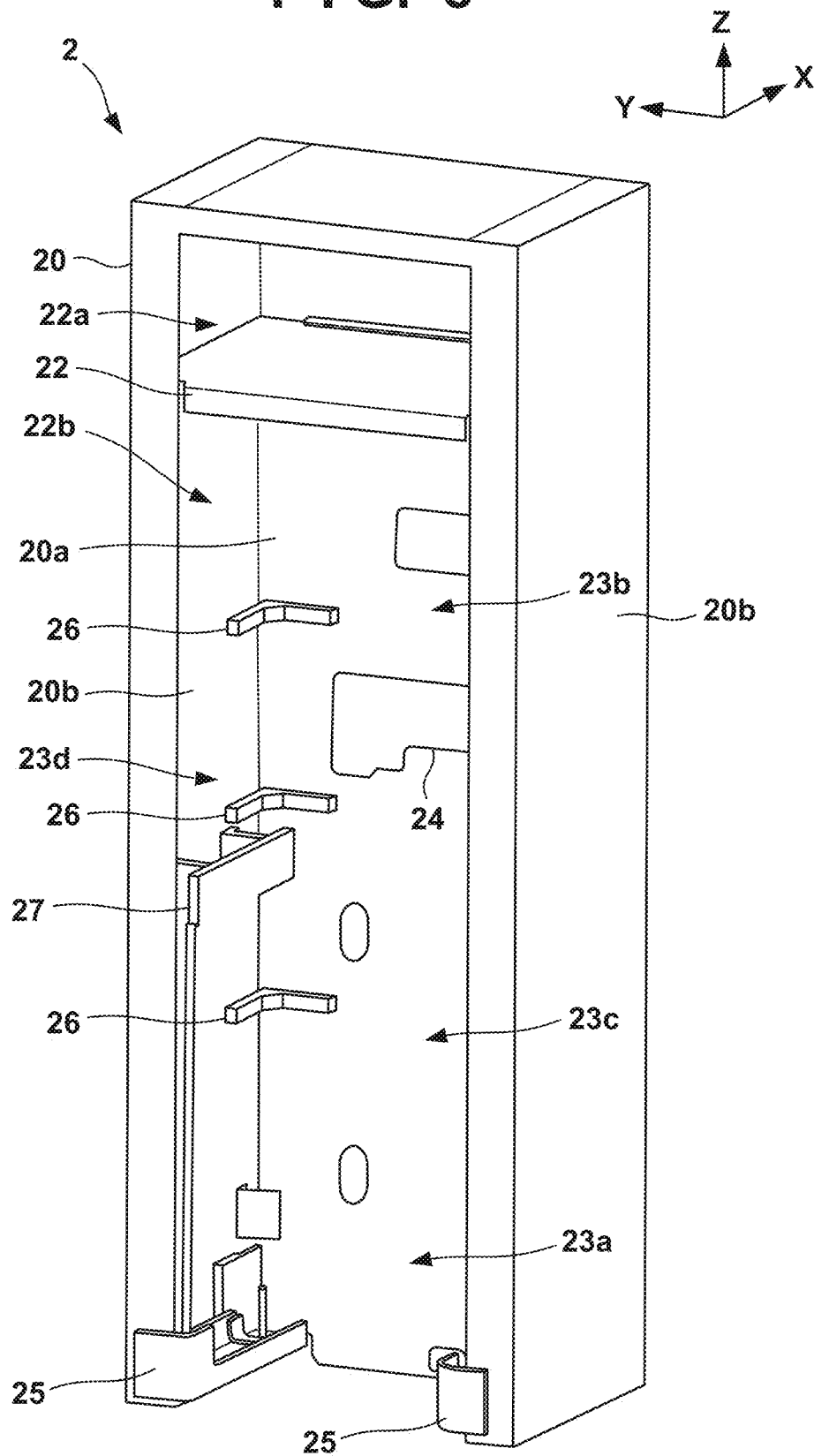
FIG. 8 is a perspective view of a main body of a housing.

Referring to FIG. 8, the internal space of the main body 20 of the housing 2 is partitioned by a partition plate 22 placed on the upper side thereof into an accommodation space 22a above the partition plate 22 and an accommodation space 22b below the partition plate 22. A control device 9 and the like that control the tray transport apparatus 1 are accommodated in the accommodation space 22a, and various mechanisms described below are accommodated in the accommodation space 22b.

The main body 20 includes a portion 23a surrounding a space for receiving the cart 120 (the container 121) of the reception portion 10 in a lower portion of the accommodation space 22b, and includes a portion 23b surrounding a space for receiving the stack SB of the accommodation portion 11 in an upper portion of the accommodation space 22b. Below the portion 23ba, an opening 24 through which the tray 130 is taken in and out from the outside is formed in the back wall 20a. Between the portion 23a and the portion 23b of the accommodation space 22b, a portion 23c that supports the transfer unit 3 and a portion 23d that supports the transport unit 4, which will be described later, are provided in the main body 20.

The position of the mechanism inside the housing 2 is determined with reference to the back wall 20a using a bracket 26 and a sub frame 27, and the mechanism is fixed to the back wall 20a and the side wall 20b. In the following description, when it is described that each structure is fixed to the back wall 20a or fixed to the side wall 20b, the case of indirectly fixing the structure to the back wall 20a or the side wall 20b using the bracket 26, the sub frame 27, or the like is also included in addition to the case of directly fixing the structure to the back wall 20a or the side wall 20b.

<Positioning Unit>

A positioning unit 7 is provided inside the housing 2. The positioning unit 7 is a mechanism that positions the container 121 in the reception portion 10. The positioning unit 7 includes an abutment member 78 that positions the container 121 in the X direction.

Two abutment members 78 are provided apart from each other in the Y direction, and they are supported by the back wall 20a. A damper 77 is also provided adjacent to the abutment member 78. The damper 77 relaxes the impact of collision between the abutment member 78 and the container 121 when the container 121 is received in the reception portion 10. A plunger of the damper 77 and the abutment member 78 both abut on the abutment member 123 of the cart 120.

A pair of positioning members 70 separated in the Y direction is provided on an upper portion of the reception portion 10. Each positioning member 70 is fixed to the side wall 20b via a corresponding support member 70a. The positioning member 70 is a shaft (pin) extending in the Z direction, and an upper end portion thereof is fixed to the support member 70a.

The positioning unit 7 includes a pair of lifting units 71. The pair of lifting units 71 is a mechanism that is driven synchronously to lift and lower the container 121 (the entire cart 120), and lifts and lowers the container 121 between a positioning position and a reception position below the positioning position. Each of the lifting units 71 includes a motor 72 as a drive source and a plate cam 73 attached to an output shaft of the motor 72. The motor 72 is fixed to the side wall 20b. Each lifting unit 71 also includes a lifting member 74. A pair of rail members 75 extending in the Z direction is fixed to each side wall 20b. The lifting member 74 includes a slider engaged with the pair of rail members 75 and a cam follower 76 abutting on the plate cam 73.

Figure 9:
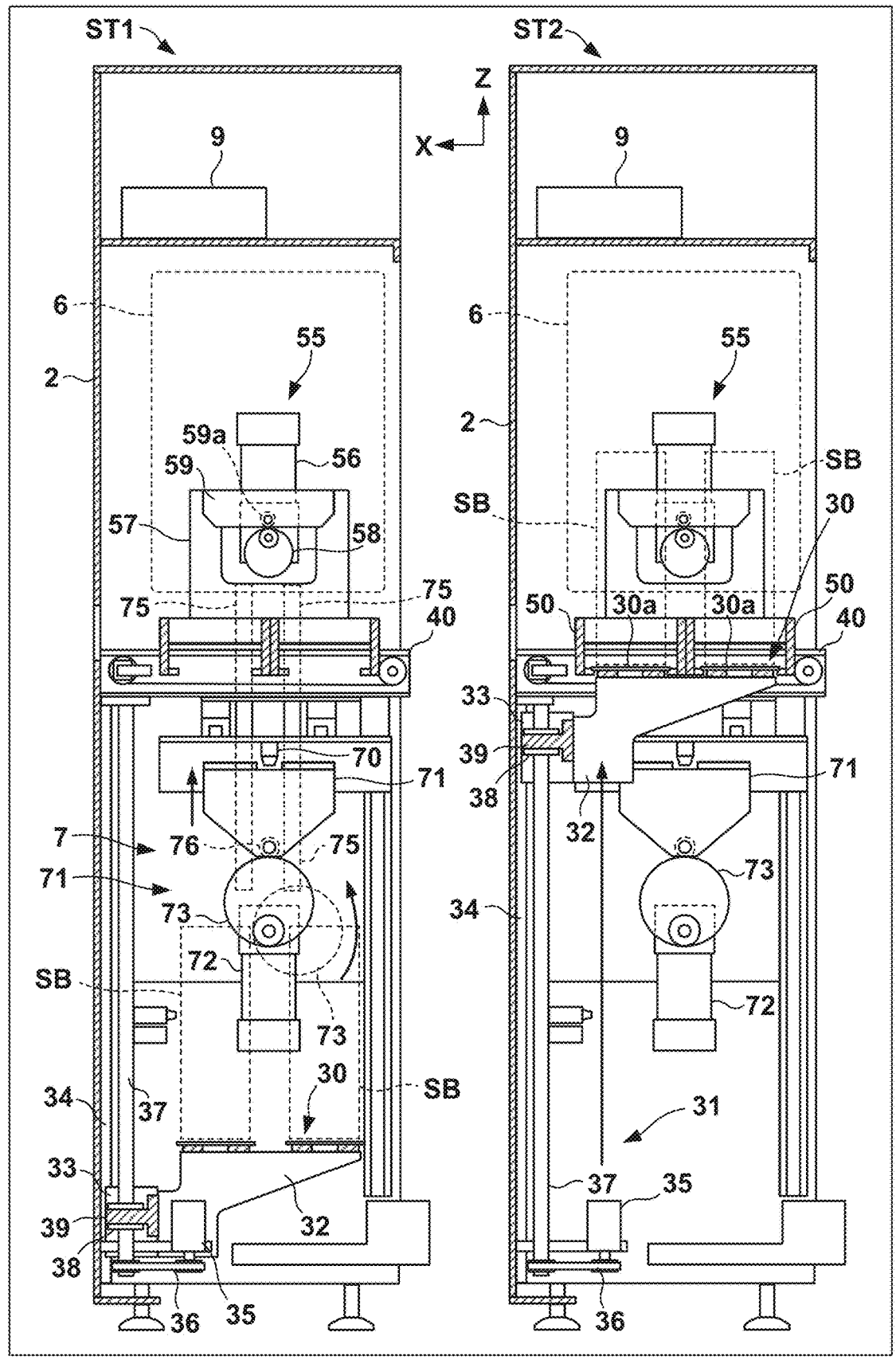
FIG. 9 is an operation explanatory diagram of a positioning unit and a transfer unit.

The state ST1 in FIG. 9 illustrates an operation example of the lifting unit 71. The axial direction of the output shaft of the motor 72 is the Y direction, and the plate cam 73 rotates on the X-Z plane. When the cam follower 76 is pushed up by the plate cam 73, the lifting member 74 is lifted.

The lifting member 74 abuts on the flange portion 127 of the container 121 from below, and the lifting member 74 lifts the container 121 by moving up. When the positioning member 70 is fitted to the engagement portion 128 of the flange portion 127, the container 121 is positioned in both the X direction and the Y direction in the reception portion 10. When the lifting of the lifting member 74 is completed, the position of the container 121 in the Z direction is defined.

<Transfer Unit>

The transfer unit 3 is provided inside the housing 2. The transfer unit 3 is a mechanism that transfers the stack SB between the reception portion 10 and the accommodation portion 11. More specifically, for example, lifting the stack SB from the container 121 received by the reception portion 10 causes the stack SB to be separated from the container 121 and transferred to the accommodation portion 11. Lowering the stack SB accommodated in the accommodation portion 11 causes the stack SB to be transferred to the container 121 received in the reception portion 10.

The transfer unit 3 includes a lifting table 30. The lifting table 30 is a placement table having two placement portions 30a, and it can place two stacks SB on the placement portions 30a side by side. In other words, the transfer unit 3 can simultaneously transfer two stacks SB. Each placement portion 30a is a plate-like member whose central portion is open.

The transfer unit 3 includes a lifting unit 31 that lifts and lowers the lifting table 30 in the Z direction. The lifting unit 31 includes a support member that supports the lifting table 30 from below. The lifting unit 31 of the present embodiment includes a pair of support members 32. The pair of support members 32 is separated in the Y direction, and each support member 32 has a beak shape in side view. The lifting table 30 is horizontally supported by the pair of support members 32.

The transfer unit 3 includes a pair of sliders 33, and each support member 32 is supported by the corresponding slider 33. The pair of sliders 33 is engaged with the pair of rail members 34 fixed to the back wall 20a. The pair of rail members 34 is separated in the Y direction and extends parallel to the Z direction, and the slider 33 is slidable in the Z direction with the guide of the rail member 34. The pair of sliders 33 are coupled to each other by a coupling member 39.

The transfer unit 3 includes a ball screw shaft 37 and a ball nut 38. The ball screw shaft 37 extends in the Z direction and is supported by the back wall 20a so as to be rotatable about the axis thereof. The ball nut 38 is engaged with the ball screw shaft 37 and moves up and down with the rotation of the ball screw shaft 37.

The transfer unit 3 includes a motor 35 as a drive source. The motor 35 is disposed at a bottom portion inside the housing 2 and is supported by the back wall 20a. As illustrated in FIGS. 5 and 6, the motor 35 is located between the pair of support members 32 at the position where the lifting table 30 is lowered. The rotational force of the motor 35 is transmitted to the ball screw shaft 37 via the transmission mechanism 36. In the present embodiment, the transmission mechanism 36 is a belt transmission mechanism, but it may be a gear mechanism.

The ball nut 38 is fixed to the coupling member 39. When the ball screw shaft 37 is rotated by the driving of the motor 35, the lifting table 30, the pair of sliders 33, the ball nut 38, and the coupling member 39 integrally move in the Z direction.

The state ST2 in FIG. 9 illustrates an operation example of the transfer unit 3. Driving the motor 35 causes the lifting table 30, the pair of sliders 33, the ball nut 38, and the coupling member 39 to be integrally lifted in the Z direction as indicated by arrows.

<Transport Unit>

The transport unit 4 is provided inside the housing 2. The transport unit 4 is a mechanism that transports the tray 130 through the opening 24 formed in the back wall 20a. The opening 24 is formed on a transport path of the tray 130 to be transported by the transport unit 4. For example, when the tray 130 is unloaded, the tray 130 located at the lowermost portion of the stack SB accommodated in the accommodation portion 11 is unloaded through the opening 24. When the tray 130 is taken in through the opening 24, the tray 130 that has been taken in is transported and added to a position below the stack SB accommodated in the accommodation portion 11 (the lowest portion in the present embodiment).

The transport unit 4 includes a pair of conveyors 40 separated in the Y direction. Each conveyor 40 is a belt conveyor that transports the tray 130 in the X direction. However, the conveyor 40 may be another transport mechanism such as a roller conveyor.

Each conveyor 40 includes a base member 41 extending in the X direction. Pulleys 43 are disposed at both ends of the base member 41 in the X direction, and one pulley 43 is rotated by a motor 42 as a drive source. The motor 42 is supported by the base member 41. A belt 44 is wound between the two pulleys 43. The tray 130 is placed on the belt 44. The tray 130 on the belt 44 is transported by the traveling of the belt 44 with the driving of the motor 42. In the case of the present embodiment, two trays 130 can be arranged in the transport direction and placed on the belt 44, and the two trays 130 can be transported simultaneously.

The transport unit 4 also includes a moving unit 45 that moves the conveyor 40 in the Y direction. In the case of the present embodiment, the moving unit 45 is provided for each conveyor 40. The moving unit 45 includes a slider 46, a rail member 47 engaged with the slider 46, and an actuator 48. The rail member 47 extends in the Y direction, and the slider 46 is movable in the Y direction with the guide of the rail member 47. The actuator 48 is, for example, an electric cylinder, and it biases the movement of the slider 46 in the Y direction. The conveyor 40 is mounted on the slider 46 and moves in the Y direction with driving of the actuator 48.

Figure 10:
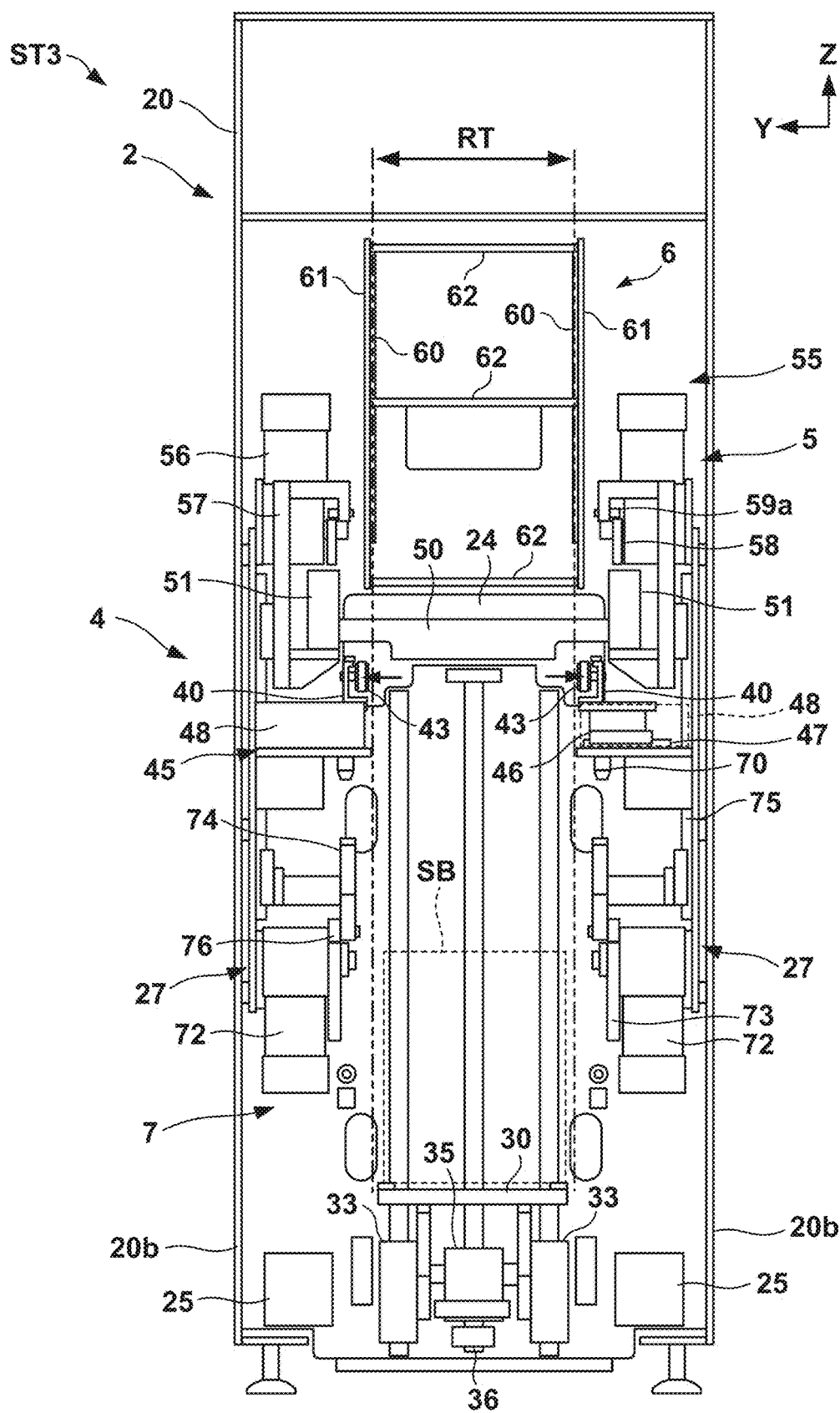
FIG. 10 is an operation explanatory diagram of the transport unit.

The two moving units 45 are synchronously driven, and the pair of conveyors 40 moves between a transport position illustrated in FIG. 5 and a retraction position illustrated in the state ST3 of FIG. 10. The transport position is a position where the pair of conveyors 40 is closer to each other than in the retraction position, and is a position where the tray 130 is placed across the pair of conveyors 40. The retraction position is a position where the pair of conveyors 40 is separated from each other with respect to the transport position, and is a position where the tray 130 (stack SB) can pass between the pair of conveyors 40 and move. An arrow in FIG. 10 indicates a direction (Y direction) in which the conveyor 40 moves from the transport position to the retraction position.

As illustrated in FIG. 10, the pair of conveyors 40 is located outside a transfer path RT at the retraction position. The transfer path RT is a space through which the stack SB passes when the stack SB is transferred between the reception portion 10 and the accommodation portion 11. At the transport position, the pair of conveyors 40 is located in the transfer path RT.

The position of the conveyor 40 is detected by a sensor SR2. The sensor SR2 is, for example, a position sensor. Each conveyor 40 includes a sensor SR3 that detects whether the tray 130 is placed on the belt 44. The sensor SR3 is, for example, a reflective optical sensor.

<Accommodation Frame>

An accommodation frame 6 is disposed in the accommodation portion 11. The accommodation frame 6 includes a pair of panel members 61 separated in the Y direction. The pair of panel members 61 is coupled by a plurality of shaft members 62 extending in the Y direction. The pair of panel members 61 is fixed to the back wall 20a. The panel members 61 are disposed apart from each other, and a plurality of guide members 60 extending in the Z direction, which is a lifting-lowering direction of the stack SB, are provided inner side surfaces facing each other. The plurality of guide members 60 have the same structure as the guide member 122a of the container 121, and are disposed in the same manner as the guide member 122a of the container 121. That is, the guide member 60 is disposed on an extension line of the guide direction of the guide member 122a, and it guides the lifting and lowering of the stack SB.

That is, each of the guide members 60 is a rail member having an L-shaped horizontal cross section extending in the Z direction, which is the lifting-lowering direction of the stack SB, and one panel member 61 has four guide members 60. One stack SB is guided in an up-down movement by each pair of guide members 60 (four guide members 60 in total) of the left and right panel members 61. Two stacks SB are accommodated side by side in one accommodation frame 6.

The plurality of guide members 60 guide the stack SB transferred by the transfer unit 3, and define the accommodation position of the stack SB in the X and Y directions in the accommodation portion 11 (the accommodation space of the stack SB in the accommodation portion 11). On the other hand, the accommodation frame 6 itself does not define the position of the stack SB in the Z direction, and the position of the stack SB in the Z direction is defined by the holding unit 5.

A sensor SR4 that detects the stack SB is provided on the lower side of the accommodation frame 6, and a sensor SR5 that detects the stack SB is provided on the upper side of the accommodation frame 6. The sensors SR4 and SR5 are, for example, reflective optical sensors. The sensors SR4 and SR5 can detect the amount of the stack SB (remaining number of trays 130) stored in the accommodation frame 6.

<Holding Unit>

The holding unit 5 is provided inside the housing 2. The holding unit 5 is a mechanism that positions the stack SB at a supporting position in the Z direction of the stack SB in the accommodation portion 11, holds the stack SB, and lifts and lowers the stack SB. The holding unit 5 has a pair of support members 50 for one stack SB. The holding unit 5 of the present embodiment can simultaneously hold two stacks SB. Thus, two pairs of support members 50 are provided, and a total of four support members 50 are provided.

Each support member 50 includes a plurality of support portions 50a and an arm portion 50b to which the plurality of support portions 50a are fixed. The arm portion 50b is made of a thin plate-shaped member whose normal direction is the X direction, and the arm portion crosses the transport unit 4 in the Y direction. The plurality of support portions 50a are provided at the lower end portion of the arm portion 50b to be separated in the Y direction, and in the case of the present embodiment, one support member 50 is provided with two support portions 50a. The support portion 50a is a claw-like portion protruding in the X direction from the arm portion 50b. Each support portion 50a of the pair of support members 50 facing each other in the X direction protrudes inward. When the support portion 50a is moved in the X direction, the support portion 50a is inserted into the stepped portion 132 of the tray 130, and the tray 130 can be supported from below by the support portion 50a.

The holding unit 5 includes a pair of moving units 51. In the pair of moving units 51, one moving unit and the other moving unit are disposed apart from each other in the Y direction, and the arm portion 50b of each support member 50 is bridged between the pair of moving units 51. The moving unit 51 moves between a support position where the support portions 50a of the pair of support members 50 can support the stack SB, the position being set in the transfer path RT, and a release position where the support portions are separated from each other more than in the support position and the support of the stack SB is released, the position being set outside the transfer path RT. FIG. 7 illustrates an example of the release position, and the distance L1 in the X direction between the support portions 50a of the pair of support members 50 facing each other is larger than the width (here, the minimum width) in the X direction of the placement portion 30a. Thus, when the pair of support members 50 is at the release position in FIG. 7, the placement portion 30a and the stack SB can pass between the pair of support members 50 in the Z direction without interfering with the support members 50. The width of the stack SB (tray 130) in the X direction is formed to be equal to or smaller than the width of the placement portion 30a in the X direction.

Each moving unit 51 includes a rail member 53 extending in the X direction, four sliders 52 slidable in the X direction on the rail member 53, and an actuator 54 that approaches and separates any two sliders 52 among the four sliders 52 adjacent to each other on one side or the other side. The arm portion 50b of the support member 50 is bridged on the sliders 52 disposed facing corresponding moving units 51 separated in the Y direction. The actuator 54 is, for example, an electric cylinder. One actuator 54 is provided in each of the moving units 51. The actuator 54 included in one moving unit 51 of the pair of moving units 51 moves two adjacent sliders 52 on one side among the four sliders 52 of the one moving unit 51 to approach and separate the two sliders 52, thereby moving two adjacent sliders 52 on one side disposed facing each other among the four sliders 52 of the other moving unit 51 to approach and separate the two sliders via the arm portion 50b of the support member 50. The actuator 54 included in the other moving unit of the pair of moving units 51 moves two adjacent sliders 52 on the other side among the four sliders 52 of the other moving unit to approach and separate the two sliders 52, thereby moving two adjacent sliders 52 on the other side disposed facing each other among the four sliders 52 of one moving unit 51 to approach and separate the two sliders via the arm portion 50b pf the support member 50. One actuator 54 can move the pair of support members 50 between the support position and the release position.

Figure 11:
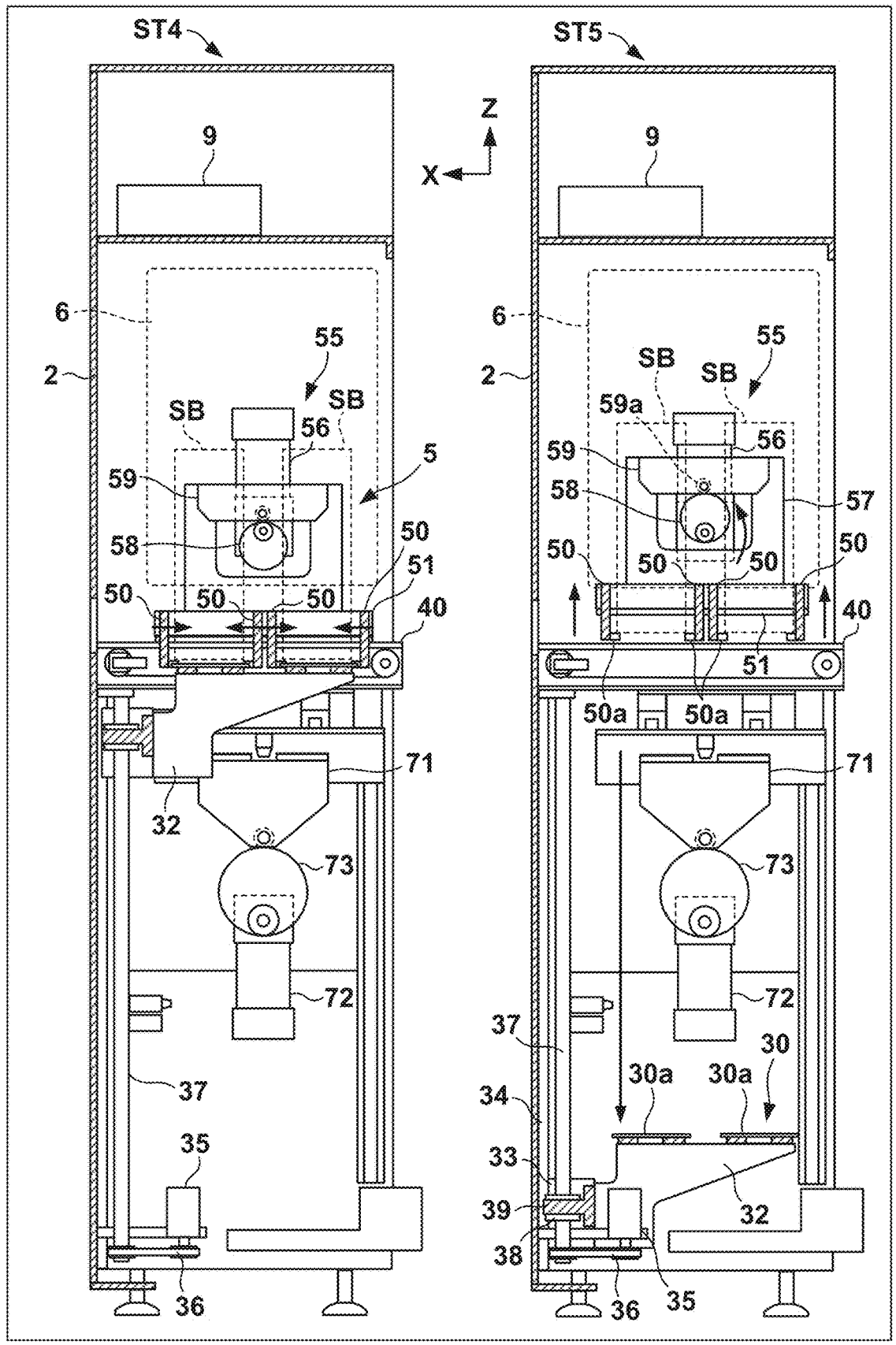
FIG. 11 is an operation explanatory diagram of a holding unit.

The state ST4 in FIG. 11 illustrates a mode in which each support member 50 moves from the release position to the support position. The two pairs of support members 50 move in the X direction in directions approaching each other. The state ST4 exemplifies an operation when the placement portion 30a is at a lifted position and the stack SB is received by the pair of support members 50 from the placement portion 30a.

Each actuator 54 is provided with a sensor SR6. The sensor SR6 is a position sensor that detects the operation amount of the actuator 54, and it can specify one of the support position and the release position of the corresponding pair of support members 50 from the detection result of the sensor SR6.

The holding unit 5 includes two lifting units 55 separated from each other in the Y direction. The two lifting units 55 are synchronously driven to simultaneously lift and lower the pair of moving units 51 and the four support members 50. Each lifting unit 55 includes a plate-shaped lifting member 57. The moving unit 51 is fixed to the lifting member 57. In each lifting member 57, two sliders 57a respectively engaged with a pair of rail members 75 extending in the Z direction are fixed. Each lifting member 57 can be lifted and lowered up and down with the guide of the corresponding pair of rail members 75. The pair of rail members 75 is shared by the lifting unit 55 and the lifting unit 71.

Each lifting unit 55 includes a motor 56 which is a drive source fixed to the side wall 20b. A plate cam 58 is attached to an output shaft of the motor 56. An L-shaped arm member 59 is fixed to the lifting member 57, and a cam follower 59a is rotatably supported at an end of the arm member 59. The peripheral surface of the plate cam 58 and the cam follower 59a abut on each other, and the lifting member 57 can be lifted and lowered by the rotation of the plate cam 58. This makes it possible to lift and lower the support member 50.

The state ST5 in FIG. 11 illustrates a lifting operation of the lifting member 57. The axial direction of the output shaft of the motor 56 is the Y direction, and the plate cam 58 rotates on the X-Z plane. When the cam follower 59a is pushed up by the plate cam 58, the lifting member 57 is lifted. The state ST5 exemplifies an operation when the stack SB is received by the pair of support members 50 from the placement portion 30a and lifted. The lifting table 30 is lowered after transferring the stack SB to the pair of support members 50.

The lifting amount of the support member 50 is controlled by the rotation amount of the plate cam 58 (that is, the rotation amount of the output shaft of the motor 56). The position of the support member 50 in the Z direction through the control includes a height (first height) at which the support portion 50a is lower than the belt 44 of the pair of conveyors 40, a height (second height) at which the support portion 50a can be inserted into the stepped portion 132 of the tray 130 on the belt 44, and a height (third height) where the support portion 50a is higher than the belt 44.

<Relay Unit>

The relay unit 8 relays the transport of the tray 130 between the transport unit 4 and an external tray transport mechanism (the conveyor 104 or the conveyor 106 in the system of FIG. 1) having different transport heights. As illustrated in FIGS. 4 and 6, the relay unit 8 of the present embodiment includes a pair of relay conveyors 80 and a lifting unit 85 that lifts and lowers and horizontally turns the pair of relay conveyors 80.

Each relay conveyor 80 is a belt conveyor that transports the tray 130 in the X direction. However, the relay conveyor 80 may be another transport mechanism such as a roller conveyor. Each relay conveyor 80 includes a base member 81 extending in the X direction. Pulleys 83 are disposed at both ends of the base member 81 in the X direction, and one pulley 83 is rotated by a motor 82 as a drive source. The motor 82 is supported by the base member 81. A belt 84 is wound between the two pulleys 83. The tray 130 is placed on the belt 84. The tray 130 on the belt 84 is transported by the traveling of the belt 84 with the driving of the motor 82. In the case of the present embodiment, in the same manner as the pair of conveyors 40, the pair of relay conveyors 80 can place two trays 130 side by side in the transport direction on the belt 84, and can simultaneously transport the two trays 130.

The lifting unit 85 is an electric actuator that lifts and lowers the pair of relay conveyors 80 between a lifted position (position indicated by a solid line) at the same transport height as the conveyor 40 of the transport unit 4 and a lowered position (position indicated by a broken line) at the same transport height as the conveyor 104 or the conveyor 106. The lifting unit 85 has a function of rotating its lifting shaft by 180 degrees about a Z axis 8a, which makes it possible to turn the direction of the tray 130 on the pair of relay conveyors 80 by 180 degrees.

<Control Device>

Figure 12:
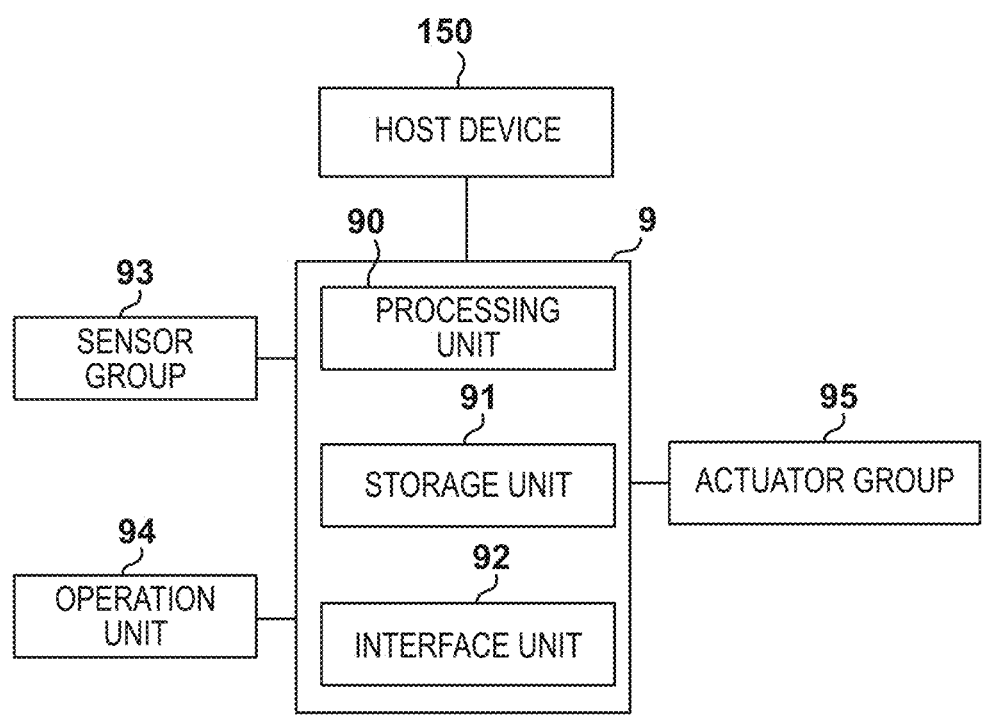
FIG. 12 is a block diagram of a control device.

FIG. 12 is a block diagram of the control device 9 that controls the tray transport apparatus 1. The control device 9 includes a processing unit 90, a storage unit 91, and an interface unit 92. The processing unit 90 is, for example, a processor represented by a CPU. The storage unit 91 is, for example, a storage device such as a semiconductor memory. The storage unit 91 stores programs executed by the processing unit 90 and various data. The program may be installed by a storage medium such as a CD-ROM. The interface unit 92 is an input/output interface and a communication interface between the processing unit 90 and an external device.

The processing unit 90 performs various types of control processing such as drive control of an actuator group 95 in response to a detection result of a sensor group 93, an instruction of a worker to the operation unit 94, or an instruction from the host device 150. The sensor group 93 includes the sensors SR1 to SR6 and the like. The actuator group 95 includes motors 35, 42, 56, 72, and 82 and actuators 48 and 54. The operation unit 94 is a device to which a worker's instruction is input, and it is, for example, a touch panel or a button switch. The host device 150 is a computer that controls the entire transfer system 100.

Control Example

Figure 13:
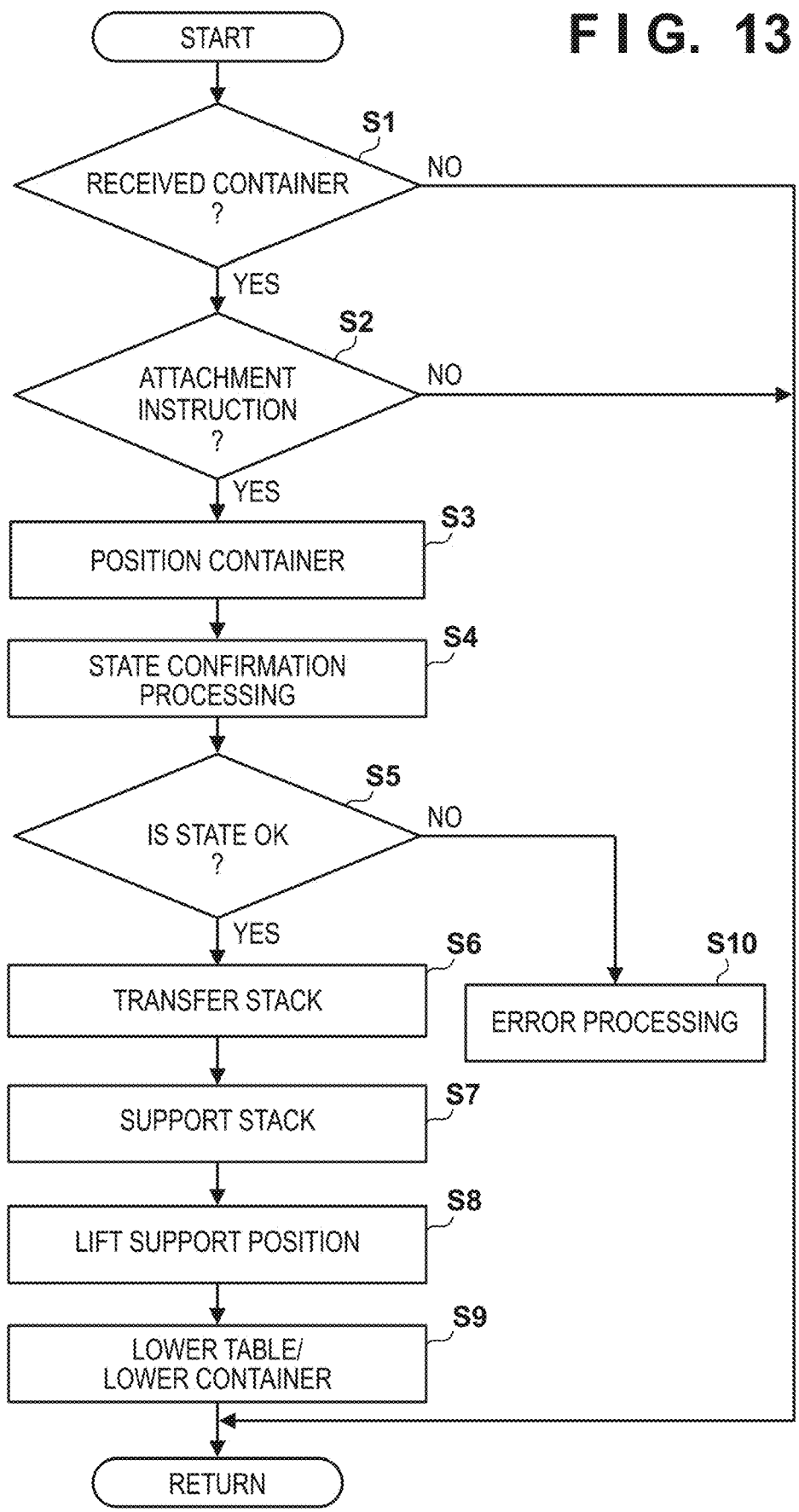
FIG. 13 is a flowchart illustrating a control example.

A control example of the control device 9 will be described. FIG. 13 is a flowchart illustrating a processing example (program) executed by the processing unit 90. The processing example of FIG. 13 illustrates a processing example when the stack SB is transferred to the accommodation portion 11 in response to the cart 120 being received by the reception portion 10 of the tray transport apparatus 1 in the tray supply area P1 (or P2). The processing example of FIG. 13 will be described with reference to operation explanatory diagrams of FIGS. 14 to 19.

Figure 14:
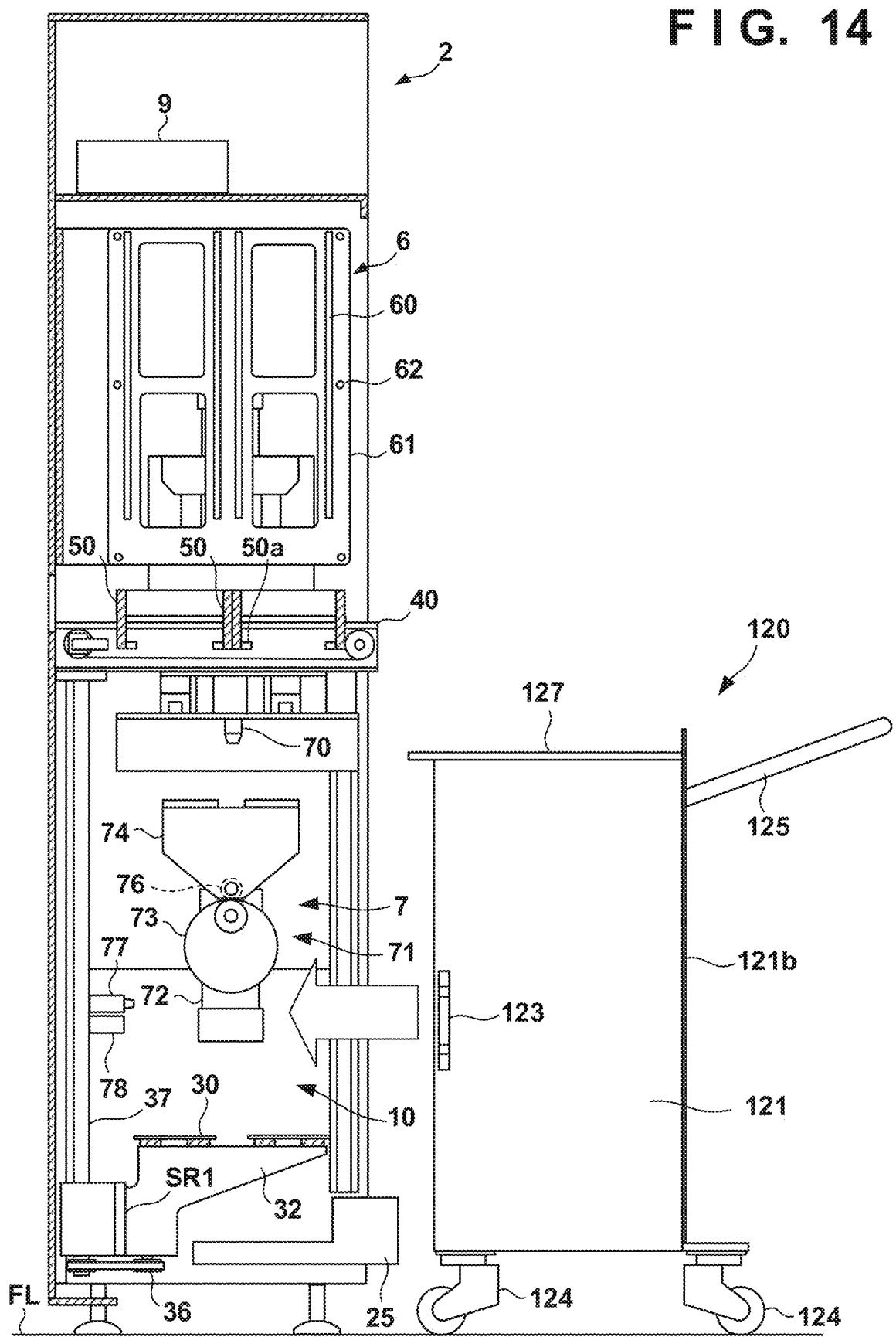
FIG. 14 is an operation explanatory diagram of the tray transport apparatus of FIG. 4.
Figure 15:
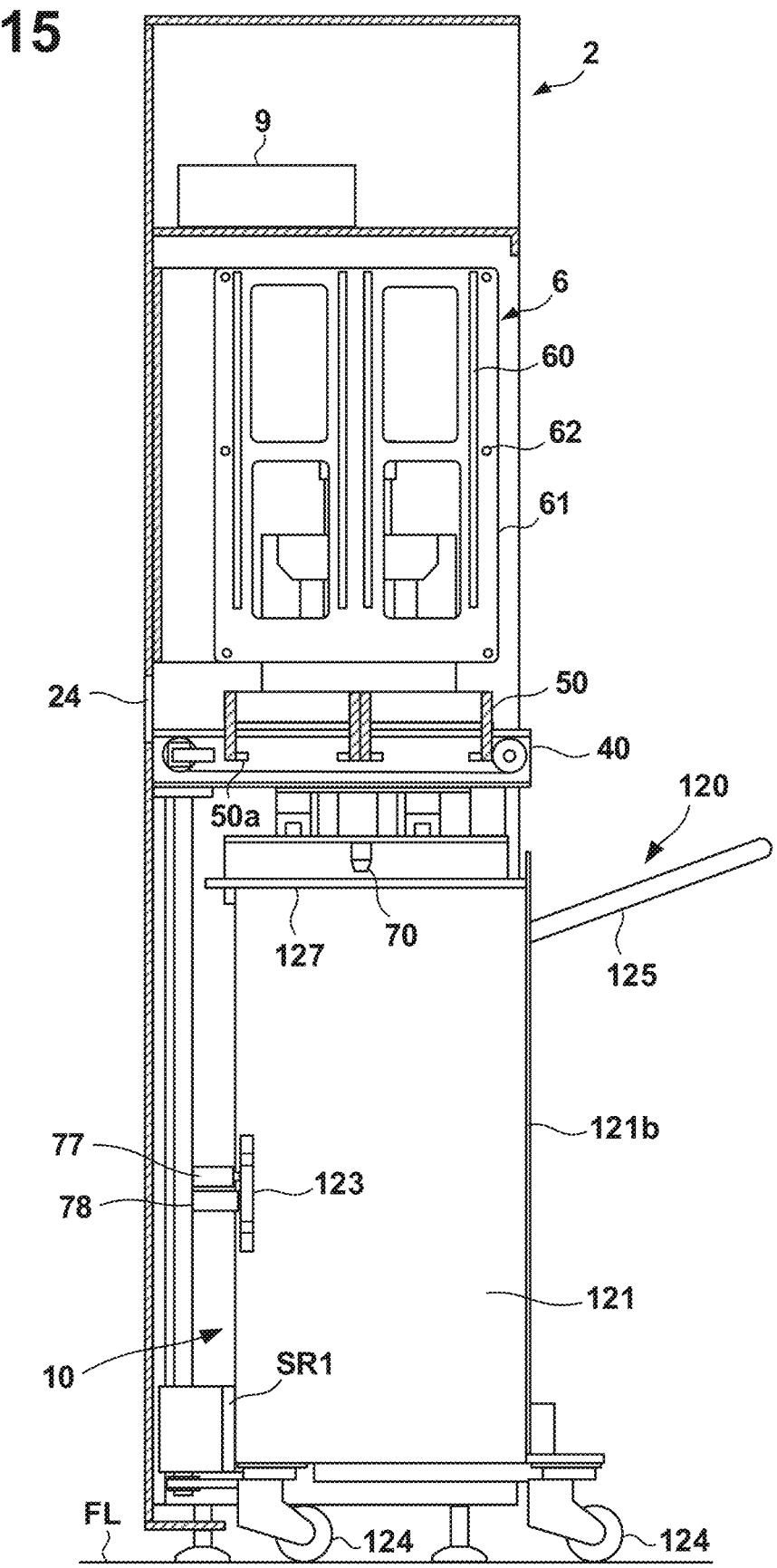
FIG. 15 is an operation explanatory diagram of the tray transport apparatus of FIG. 4.

In S1, it is determined whether the container 121 (cart 120) is received by the reception portion 10 based on the detection result of the sensor SR1. When it is determined that the insertion has been made, the processing proceeds to S2. FIGS. 14 and 15 exemplify a mode in which the worker causes the cart 120 to be received in the reception portion 10. When the cart 120 is received by the reception portion 10 from the front surface of the reception portion 10, the abutment member 78 abuts on the abutment member 123 with the plunger of the damper 77 abutting on the abutment member 123 and absorbing the impact, as illustrated in FIG. 14. The sensor SR1 detects the completion of the reception of the cart 120.

Figure 16:
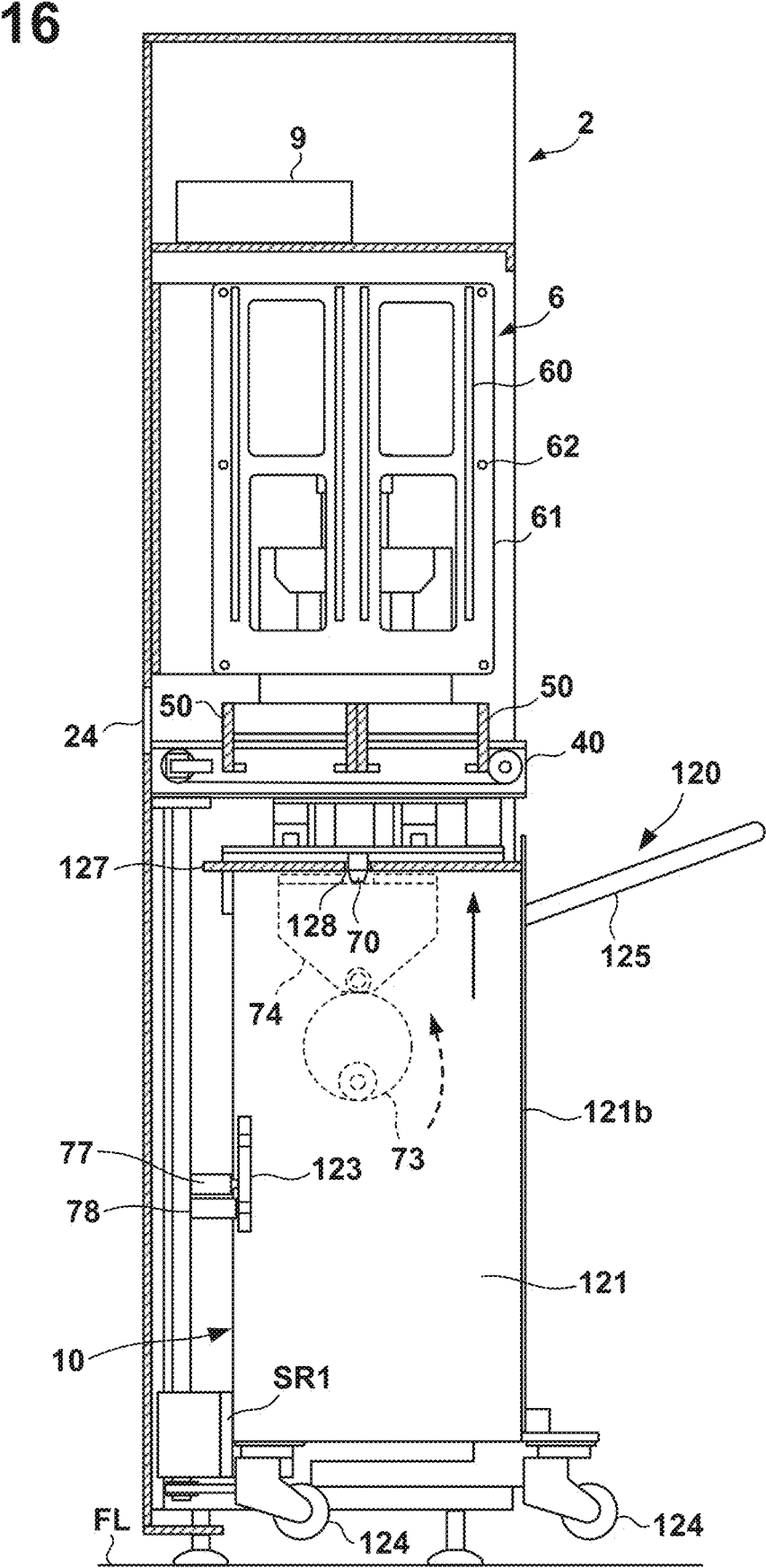
FIG. 16 is an operation explanatory diagram of the tray transport apparatus of FIG. 4.

In S2, it is determined whether the worker has given an attachment instruction from the operation unit 94. When the attachment instruction has been given, the processing proceeds to S3, and the container 121 is positioned by the positioning unit 7. As illustrated in FIG. 16, the plate cam 73 is rotated by driving of the motor 72 to lift the lifting member 74. The top portion of the lifting member 74 abuts on the flange portion 127 of the container 121 from below, the cart 120 is pushed up to the positioning position, and the cart 120 is separated from the floor FL. When the cart 120 is lifted, the abutment member 78 comes into sliding contact with the abutment member 123, which guides the pose of the cart 120 being lifted. Since the cart 120 is lifted by the lifting member 74 and separated from the floor FL, the influence from the floor FL is avoided, the positioning member 70 is fitted to the engagement portion 128 provided in the flange portion 127, and the container 121 is positioned and held in the reception portion 10.

In S4, state confirmation processing before the stack SB is transferred is executed. Here, for example, the detection result of the sensor SR2 is acquired, and it is determined whether the pair of conveyors 40 is located at the retraction position. When the pair of conveyors 40 is not located at the retraction position, the pair of conveyors is moved to the retraction position by the moving unit 45. The detection result of the sensor SR6 is acquired, it is determined whether each support member 50 is located at the release position or the support position, and when the support member is located at the support position, the support member is moved to the release position by the moving unit 51. The detection results of the sensors SR3 to SR5 are acquired, and it is confirmed whether the tray 130 is not present on the pair of conveyors 40, whether the tray 130 is not present in the accommodation frame 6, and the like.

In S5, as a result of the state confirmation processing in S4, it is determined whether the state of the tray transport apparatus 1 is a state in which the stack SB can be transferred by the lifting table 30. For example, when the movement of the pair of conveyors 40 to the retraction position cannot be confirmed, when it cannot be confirmed that each support member 50 has moved to the release position, when it is detected that the tray 130 remains in the accommodation frame 6, or when predetermined operation processing in which the stack SB cannot be transferred is being performed, it is determined that the stack SB cannot be transferred, and the processing proceeds to S10 to perform error processing. In the error processing, for example, the worker is notified that transfer is impossible or the host device 150 is notified that transfer is impossible. The error processing can also be regarded as a standby state in which the container 121 (cart 120) is held at the positioning position, and after the state in which transfer is impossible is released, the worker instructs restart from the operation unit 94, which causes the processing after S4 to be performed. The error processing can also be regarded as a reserved state for the next operation in which the container 121 (cart 120) is held at the positioning position, and the state in which transfer is impossible is released, whereby the processing after S4 is restarted.

Figure 17:
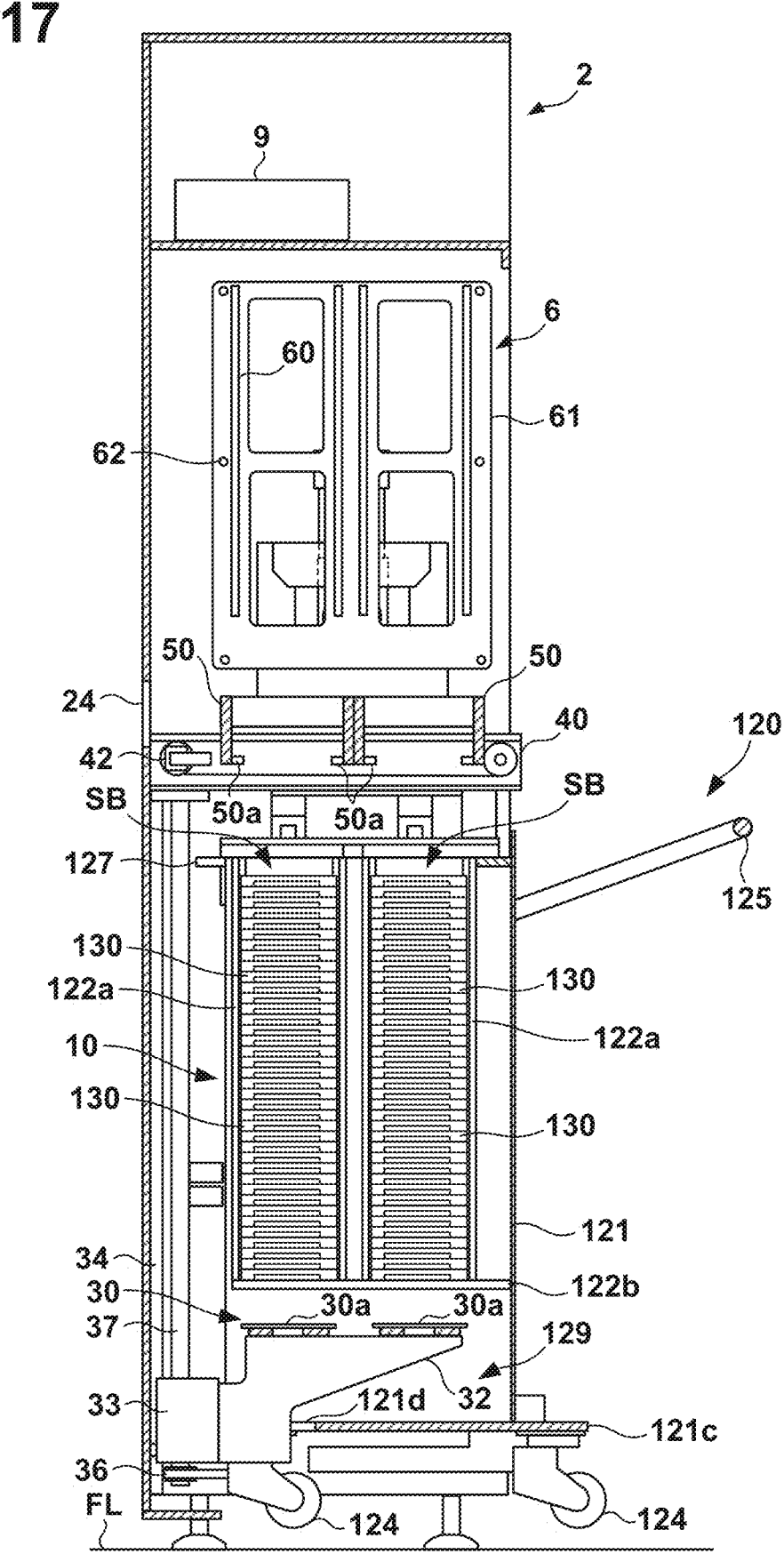
FIG. 17 is an operation explanatory diagram of the tray transport apparatus of FIG. 4.
Figure 18:
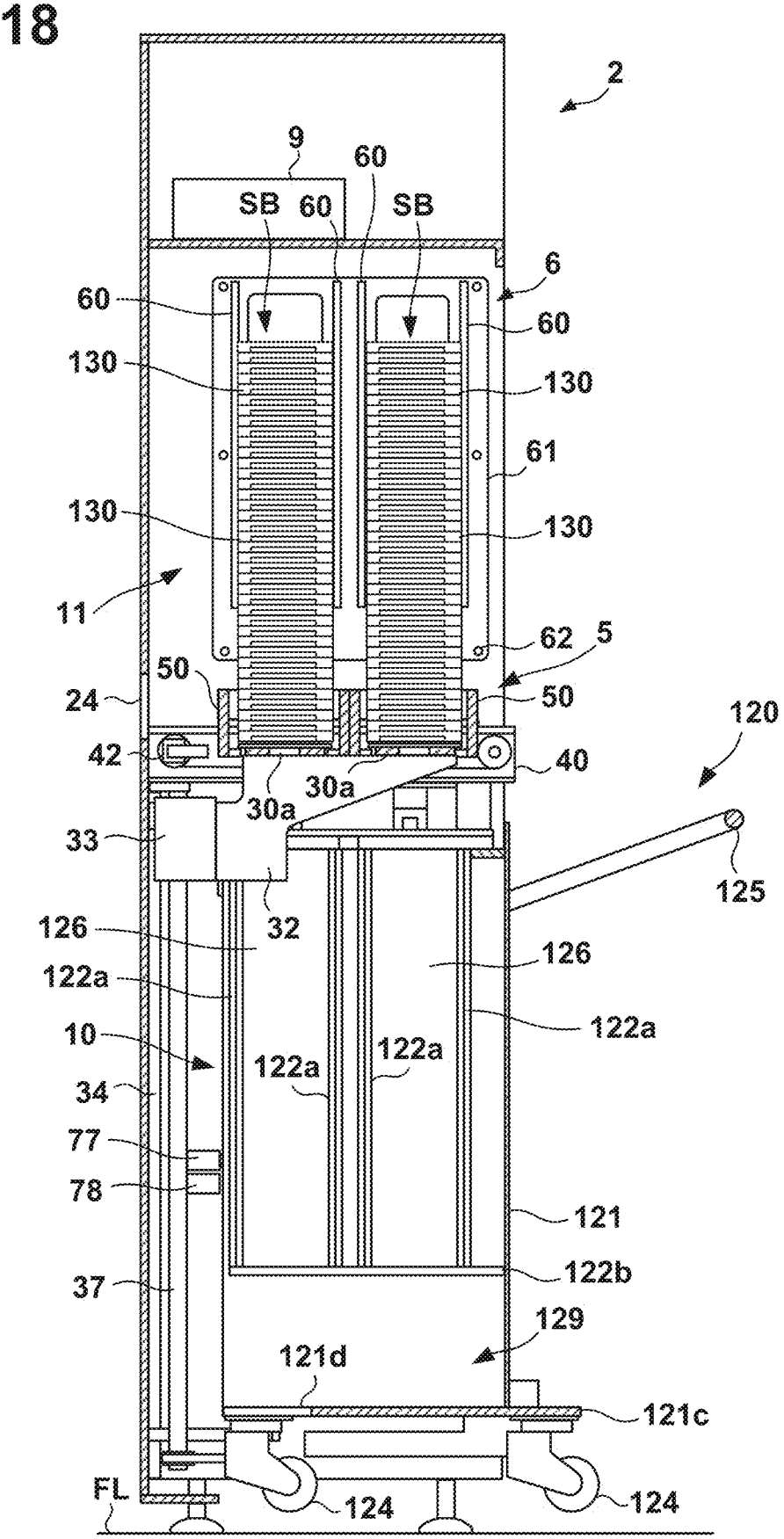
FIG. 18 is an operation explanatory diagram of the tray transport apparatus of FIG. 4.

When it is determined in S5 that the stack SB can be transferred, the processing proceeds to S6, and the stack SB accommodated in the container 121 is transferred from the reception portion 10 to the accommodation portion 11. FIGS. 17 and 18 illustrate the operation of transferring the stack SB. As illustrated in FIG. 17, in a state where the container 121 is positioned, the lifting table 30 and the support member 32 of the transfer unit 3 are received in the bottom space 129 of the container 121. The two placement portions 30a are positioned just below the two accommodation portions 126, that is, just below the two stacks SB. As illustrated in the state ST2 of FIG. 9, when the motor 35 is driven, the lifting table 30, the pair of sliders 33, the ball nut 38, and the coupling member 39 are integrally lifted and transferred from the reception portion 10 (specifically, in the container 121) to the accommodation portion 11 (specifically, in the accommodation frame 6).

As illustrated in FIG. 18, the two stacks SB transferred from the container 121 to the accommodation frame 6 pass between the pair of conveyors 40 while being guided by the plurality of guide members 122a provided in the container 121 and the plurality of guide members 60 provided in the accommodation frame 6, are separated from the container 121, and are transferred to the accommodation portion 11. The two stacks SB passing between the pair of conveyors 40 from the container 121 and being transferred to the accommodation frame 6 have upper portions guided by the guide members 60 of the accommodation frame 6 and lower portions guided by the plurality of guide members 122a provided in the container 121.

Figure 19:
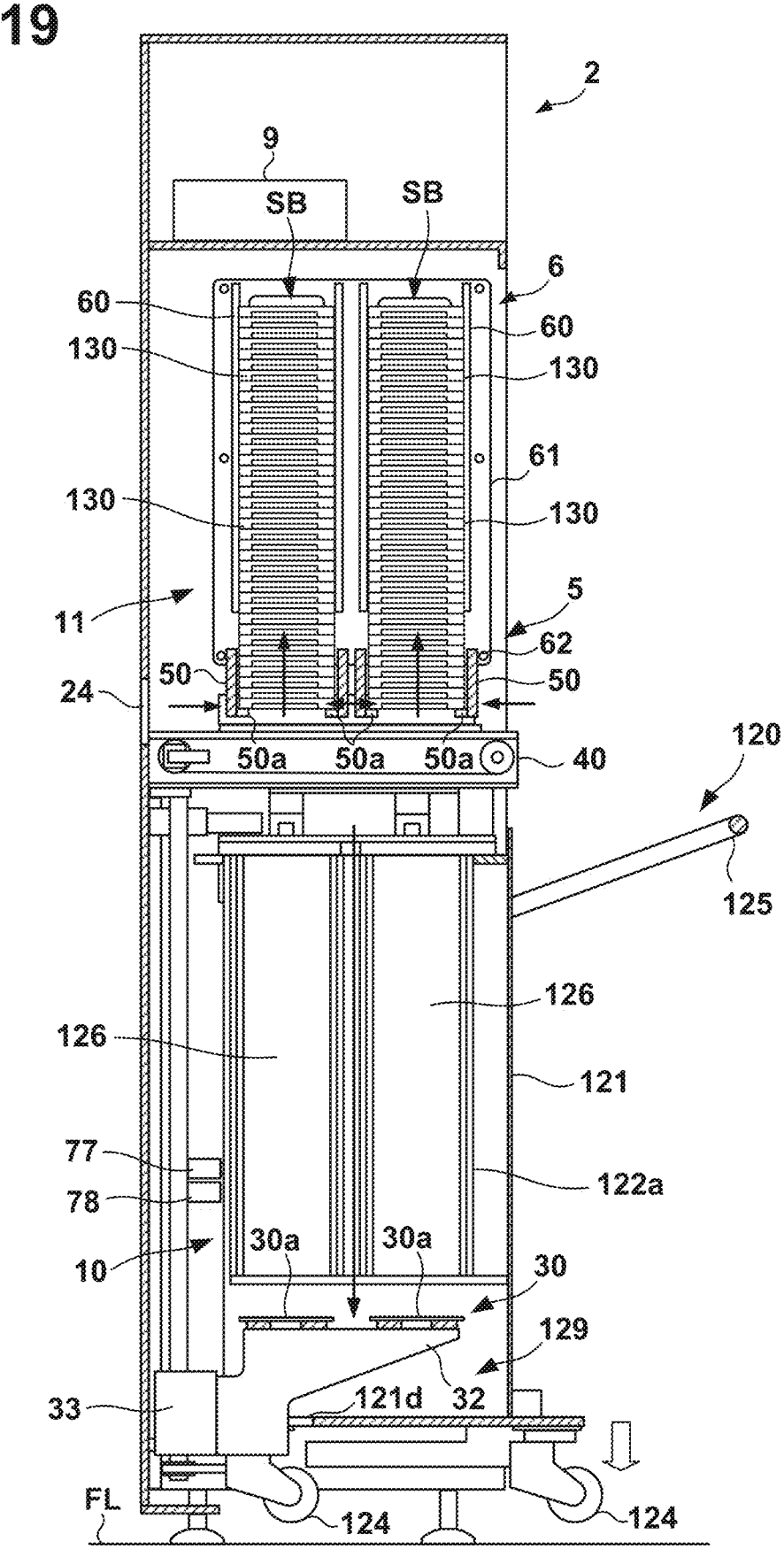
FIG. 19 is an explanatory view of an operation of the tray transport apparatus of FIG. 4.

In S7, the stack SB lifted in the accommodation portion 11 is supported by the holding unit 5, and in S8, the supporting position is lifted. In these steps, after the height of the support portion 50a of each support member 50 is adjusted, each support member 50 is moved from the release position to the support position and further lifted as illustrated in FIG. 19. Specifically, as illustrated in the state ST4 of FIG. 11, the actuator 54 is driven to move each support member 50 from the release position to the support position. Each support portion 50a enters the stepped portion 132 of the lowermost tray 130. Subsequently, each support member 50 is lifted by driving the motor 56 of the lifting unit 55, and the stack SB is lifted from the lifting table 30. The detection results of the sensors SR4 and SR5 confirm that the stack SB is accommodated in the accommodation frame 6. This completes the transfer of the stack SB.

In S9, the lifting table 30 is lowered, and then the container 121 (cart 120) is lowered to the reception position. The processing is thus completed. The lifting table 30 and the container 121 may be simultaneously lowered in S8.

Thereafter, empty cart 120 can be taken out from the reception portion 10. Another cart 120 accommodating the stack SB can be received in the reception portion 10 to prepare for the next transfer operation, and the container 121 can be replaced efficiently. This makes it possible to continuously perform the supply of the tray 130 with the tray transport apparatus 1 without interruption.

Figure 20:
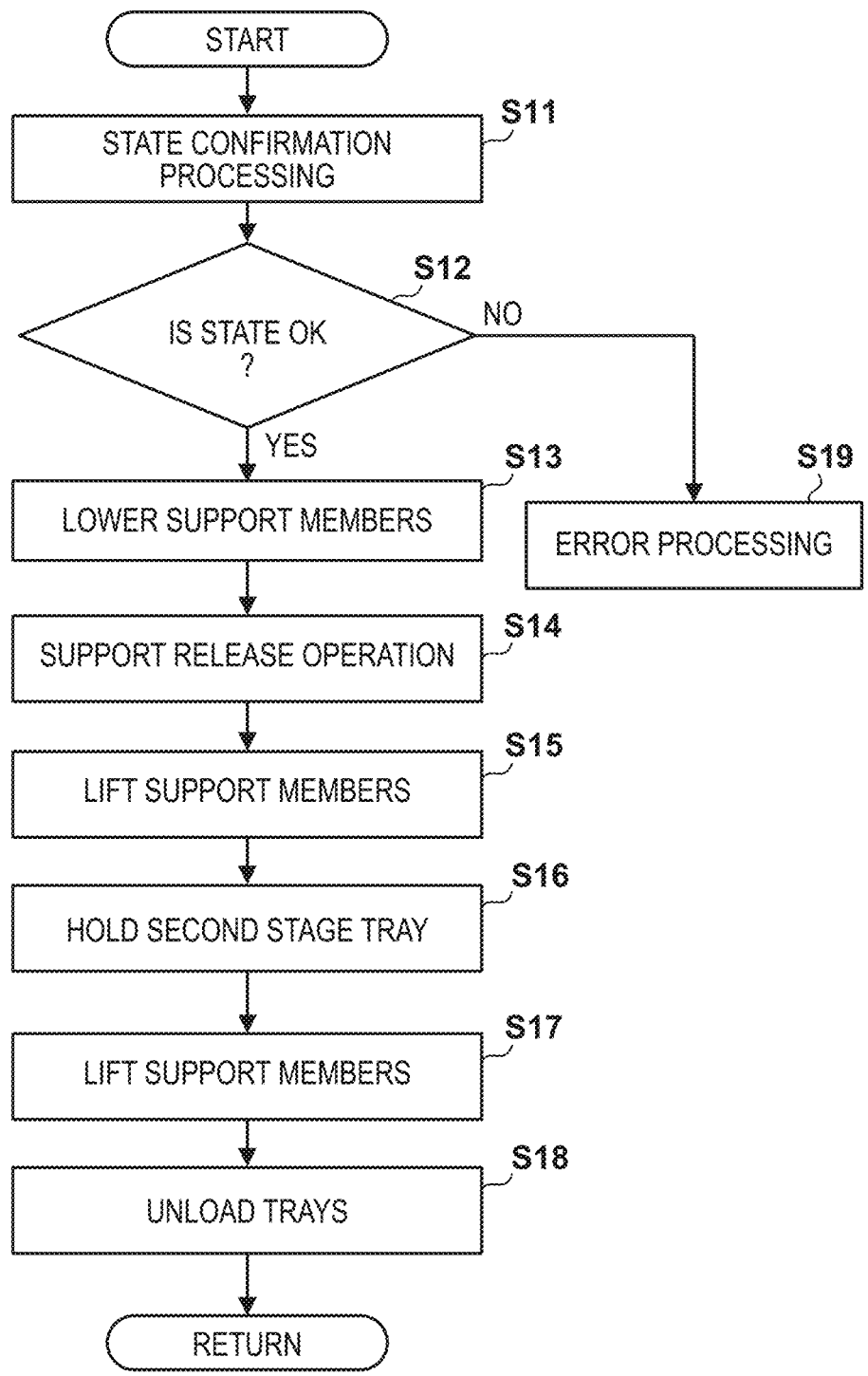
FIG. 20 is a flowchart illustrating a control example.

FIG. 20 is a flowchart illustrating another processing example executed by the processing unit 90. The processing example of FIG. 20 illustrates a processing example when the tray 130 located at the lowermost portion of the stack SB transferred to the accommodation portion 11 through the processing of FIG. 13 is unloaded in the tray supply area P1 (or P2). The processing example of FIG. 20 will be described with reference to operation explanatory diagrams of FIGS. 21 and 22.

In S11, state confirmation processing is executed. Here, for example, the detection result of the sensor SR2 is acquired, and it is determined whether the pair of conveyors 40 is located at the transport position. When the pair of conveyors 40 is not located at the transport position, the pair of conveyors is moved to the transport position by the moving unit 45. The detection results of the sensors SR3 to SR5 are acquired, and the presence or absence state of the tray 130 on the pair of conveyors 40, the presence or absence state of the tray 130 accommodated in the accommodation frame 6, and the like are determined.

In S12, as a result of the state confirmation processing in S11, it is determined whether the state of the tray transport apparatus 1 is a state in which the tray 130 can be unloaded from the lowermost portion of the stack SB accommodated in the accommodation frame 6. For example, when it cannot be confirmed that the pair of conveyors 40 has moved to the transport position, it is determined that the tray cannot be unloaded, and the processing proceeds to S19 to perform error processing. In the error processing, for example, the worker is notified that the tray 130 cannot be unloaded, or the host device 150 is notified that the tray cannot be unloaded. After the factor causing the error is eliminated, the worker instructs the restart from the operation unit 94, and thus the processing after S11 is performed.

When it is determined in S12 that the tray 130 can be unloaded, the processing proceeds to S13, and the lifting unit 55 is driven to lower each support member 50. This causes the stack SB to be placed on the pair of conveyors 40 as exemplified in the state ST11 of FIG. 21. In subsequent S14, the moving unit 51 is driven to move each support member 50 to the release position as exemplified in the state ST12 of FIG. 21.

Figure 21:
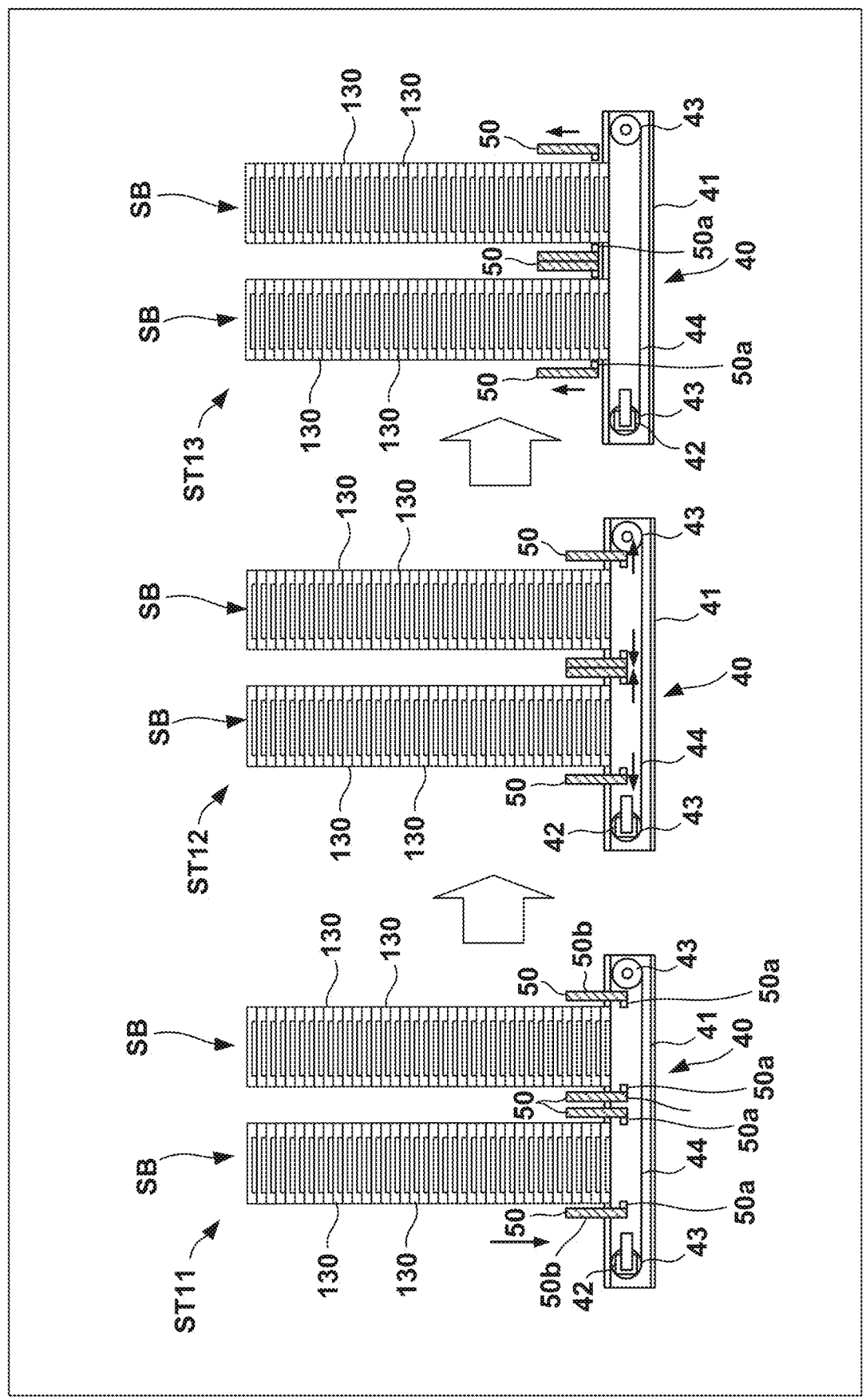
FIG. 21 is an operation explanatory diagram of the tray transport apparatus of FIG. 4.

In S15, the lifting unit 55 is driven again, and as exemplified in the state ST13 of FIG. 21, each support member 50 is lifted such that the height of each support portion 50a becomes the same as the height of the stepped portion 132 of the second tray 130 to be stacked on the lowermost tray 130 of the stack SB. The height of the support member 50 can be specified in advance in design, and does not need to be detected by a sensor.

Figure 22:
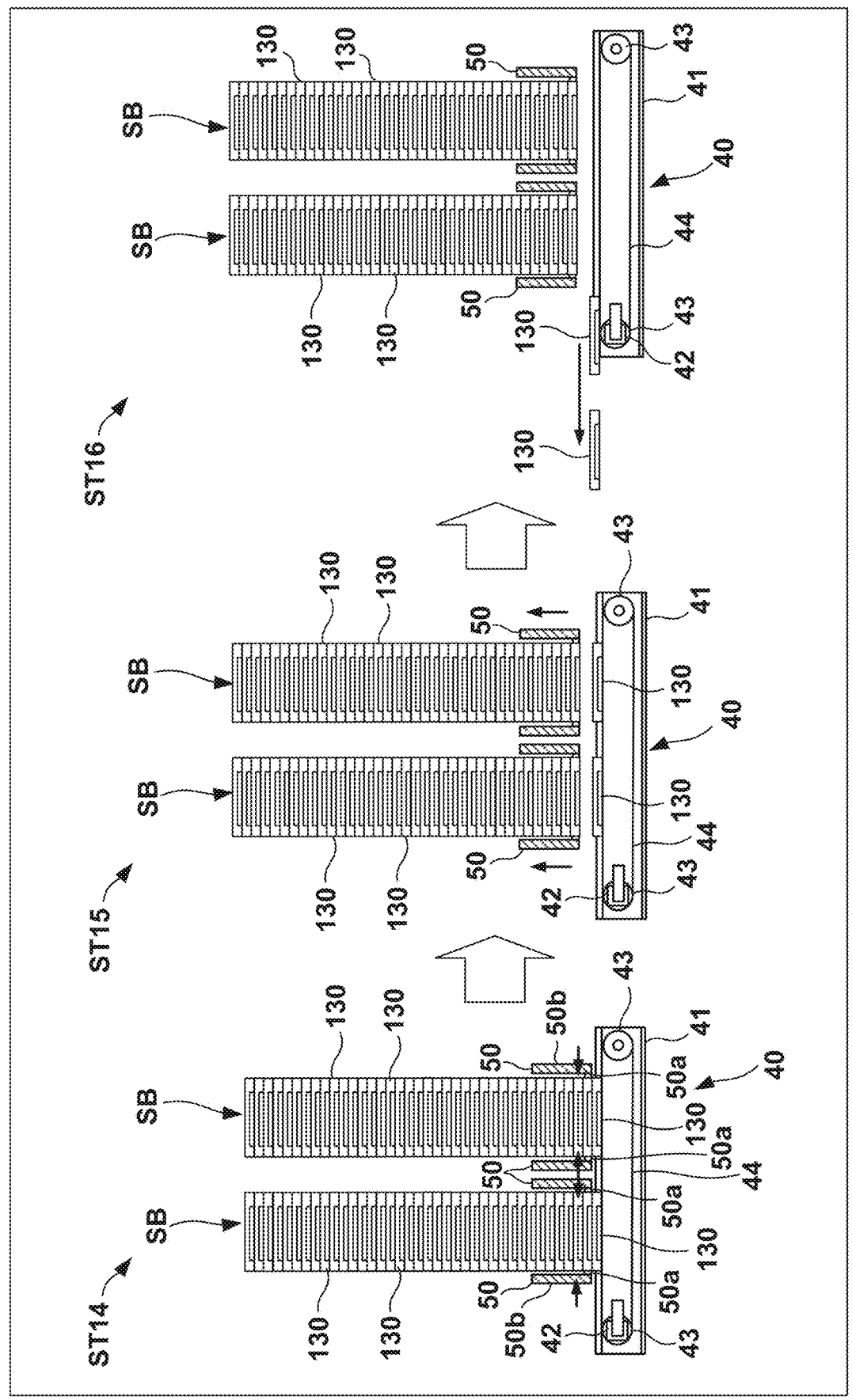
FIG. 22 is an operation explanatory diagram of the tray transport apparatus of FIG. 4.

In S16, as exemplified in the state ST14 of FIG. 22, each support member 50 is moved to the support position by the moving unit 51. The support portion 50a of each support member 50 enters the stepped portion 132 of the second tray 130 to be placed on the lowermost tray 130 of the stack SB. In S17, the lifting unit 55 is driven again to lift each support member 50. As a result, as illustrated in the state ST15 of FIG. 22, only the tray 130 positioned at the lowermost portion of each stack SB is placed on the conveyor 40, and the other trays 130 on the second or more stages are lifted up. Thus, only the lowermost tray 130 is separated from the stack SB.

In S18, the pair of conveyors 40 is driven to unload the two trays 130 on the belt 44 as illustrated in the state ST16 of FIG. 22. The two trays 130 are transported to the relay unit 8 through the opening 24.

By repeating the above processing, the lowermost tray 130 of each stack SB is sequentially unloaded. During such unloading processing of the tray 130, in the reception portion 10, the transferred container 121 (cart 120) in which the transfer of the stack SB is completed and the next container 121 (cart 120) can be replaced, and the container 121 can be efficiently replaced. Then, the tray transport apparatus 1 can perform a continuous transport operation of the tray 130.

Figure 23:
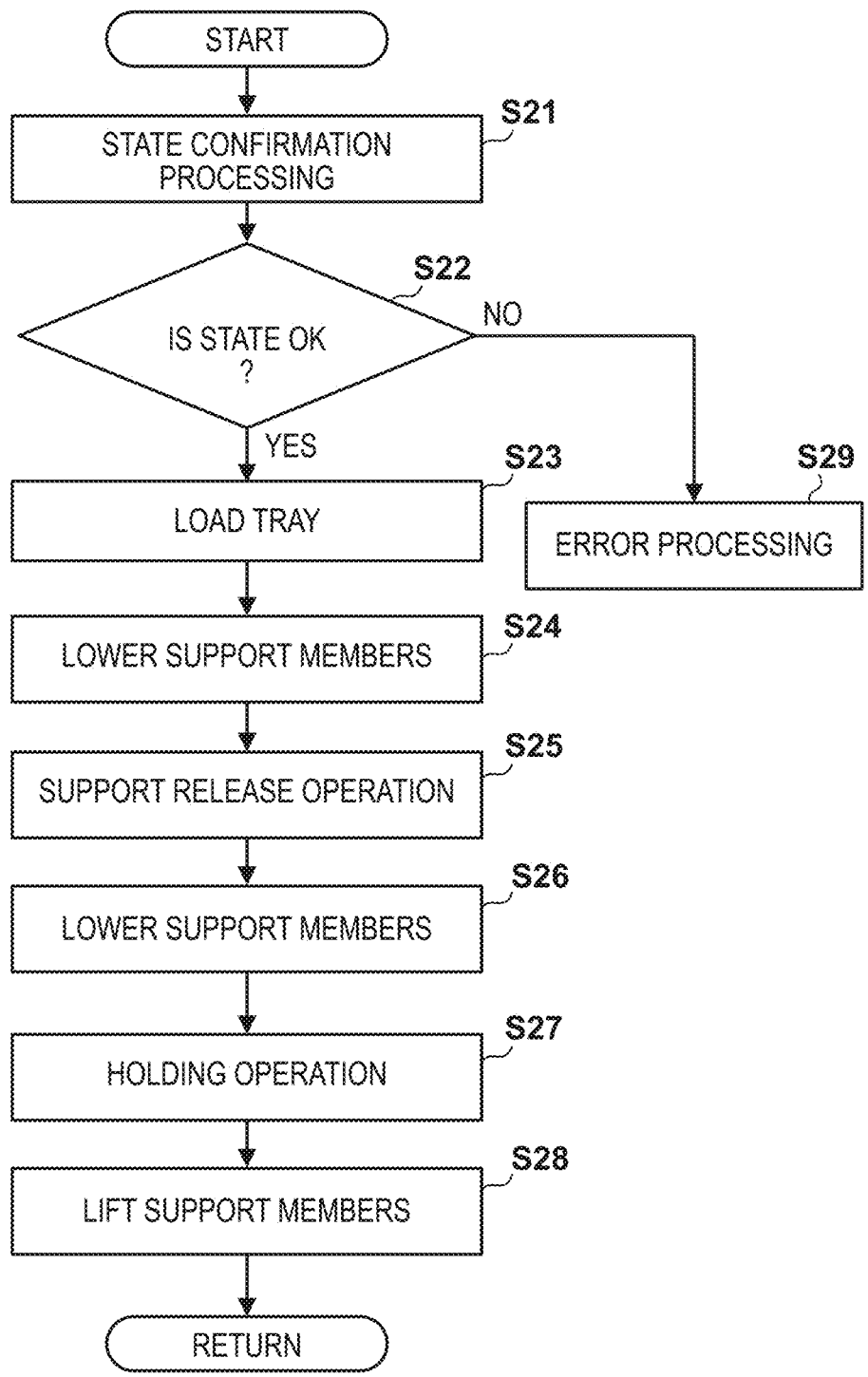
FIG. 23 is a flowchart illustrating a control example.

FIG. 23 is a flowchart illustrating another processing example executed by the processing unit 90. The processing example of FIG. 23 illustrates a processing example when the tray 130 is loaded and added to the lowermost portion of the stack SB accommodated in the accommodation portion 11 in the tray collection area P3 (or P4). The processing example of FIG. 23 will be described with reference to operation explanatory diagrams of FIGS. 24 and 25.

In S21, state confirmation processing is executed. Here, for example, the detection result of the sensor SR2 is acquired, and it is determined whether the pair of conveyors 40 is located at the transport position. When the pair of conveyors 40 is not located at the transport position, the pair of conveyors is moved to the transport position by the moving unit 45. The detection results of the sensors SR3 to SR5 are acquired, and the presence or absence state of the tray 130 on the pair of conveyors 40, the presence or absence state of the tray 130 accommodated in the accommodation frame 6, and the like are determined.

In S22, as a result of the state confirmation processing in S21, it is determined whether the state of the tray transport apparatus 1 is a state in which the tray 130 can be loaded in the accommodation frame 6. For example, when it cannot be confirmed that the pair of conveyors 40 has moved to the transport position, it is determined that the tray cannot be loaded, and the processing proceeds to S29 to perform error processing. In the error processing, for example, the worker is notified that the tray 130 cannot be loaded, or the host device 150 is notified that the tray cannot be loaded. After the factor causing the error is eliminated, the worker instructs the restart from the operation unit 94, and thus the processing after S21 is performed.

Figure 24:
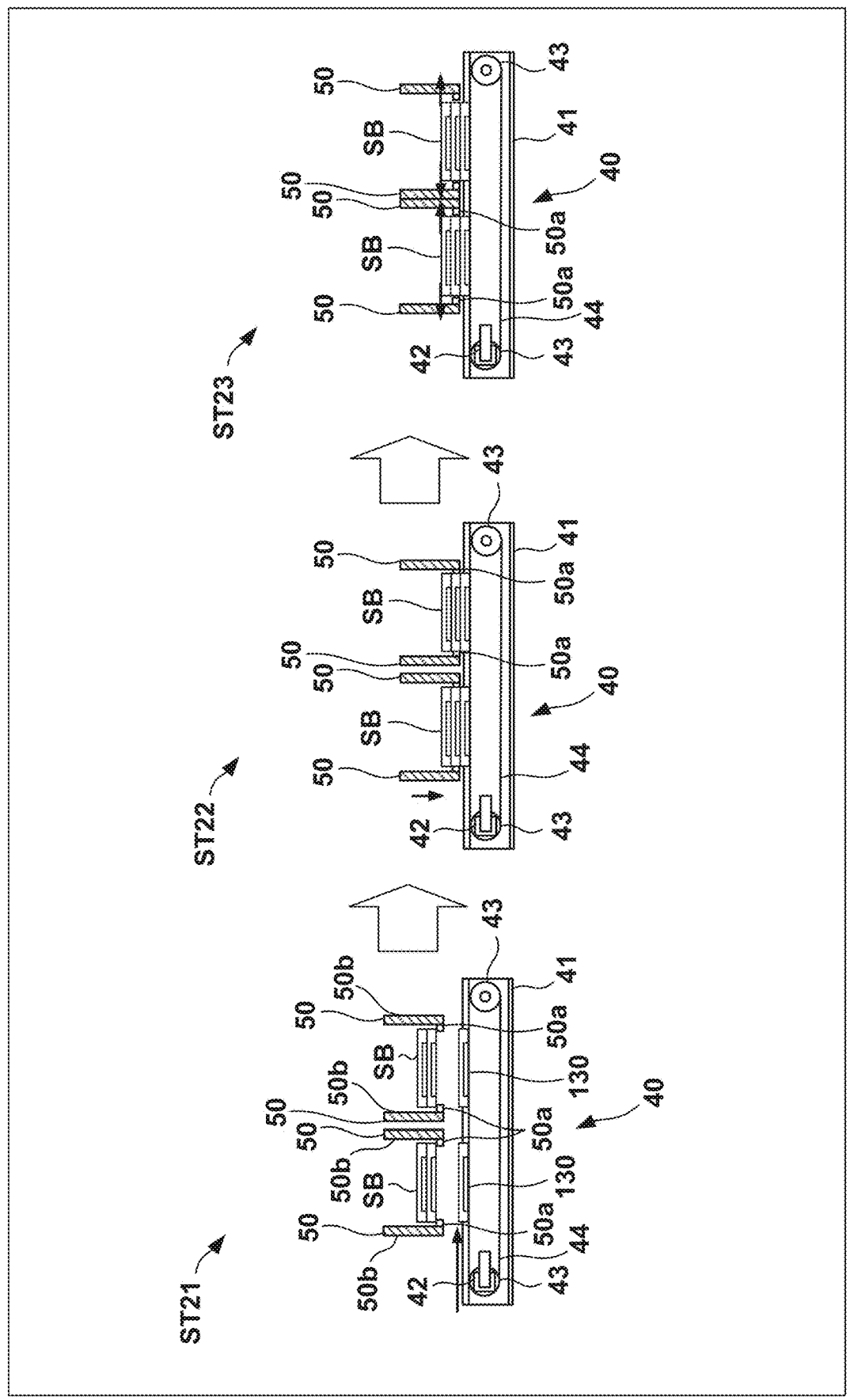
FIG. 24 is an operation explanatory diagram of the tray transport apparatus of FIG. 4.

When it is determined in S22 that the tray 130 can be loaded, the processing proceeds to S23, the relay unit 8 and the pair of conveyors 40 are driven, and the tray 130 is loaded from the relay unit 8 onto the pair of conveyors 40 as illustrated in the state ST21 of FIG. 24. In the present embodiment, two trays 130 are loaded at one time.

In S24, the lifting unit 55 is driven to lower each support member 50. This causes the stack SB to be placed on the tray 130 on the pair of conveyors 40 as exemplified in the state ST22 of FIG. 24. The stack SB to be accommodated in the accommodation frame 6 becomes a new stack SB by being stacked on the tray 130 on the pair of conveyors 40. In subsequent S25, the moving unit 51 is driven to move each support member 50 to the release position as exemplified in the state ST23 of FIG. 24.

Figure 25:
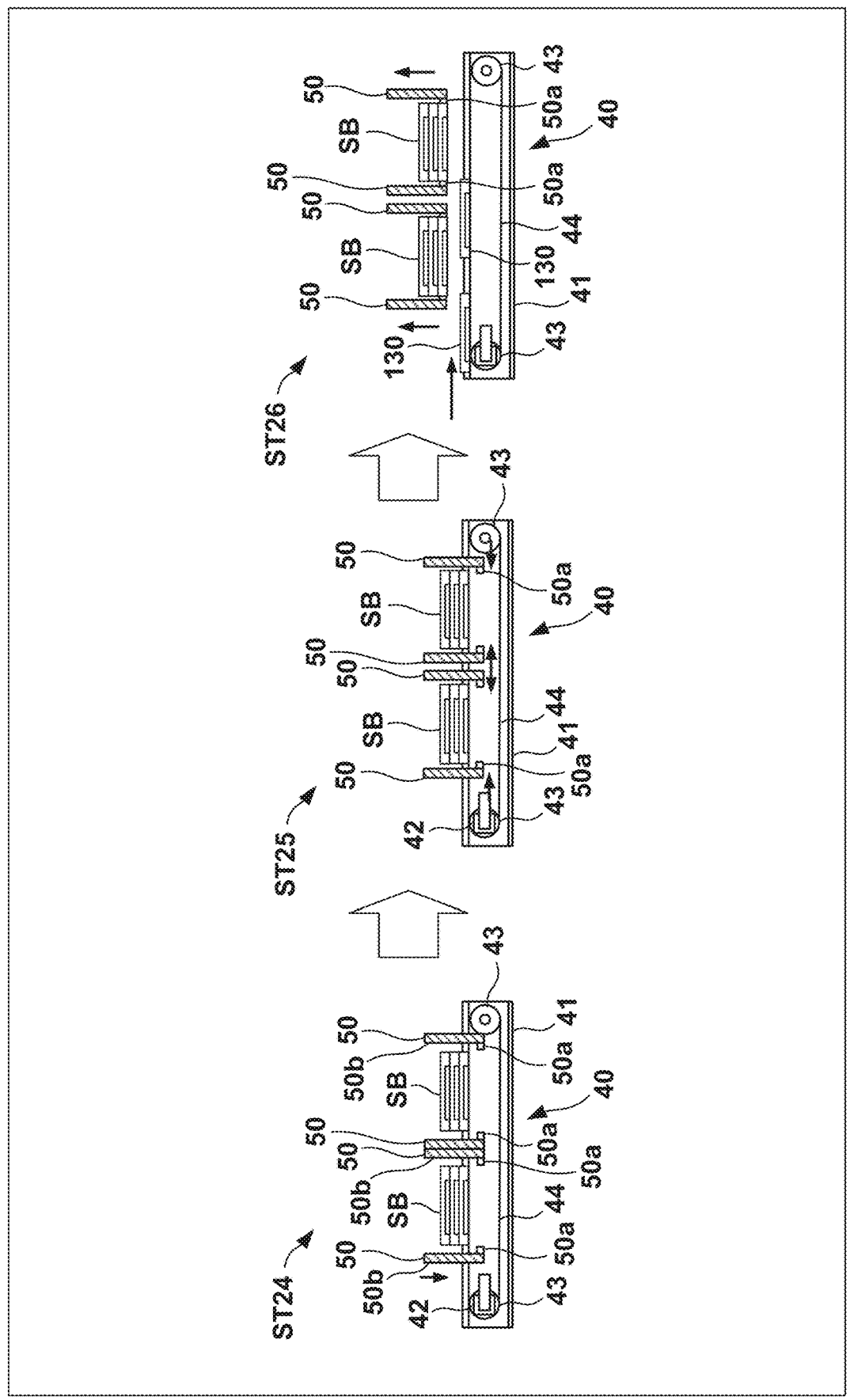
FIG. 25 is an operation explanatory diagram of the tray transport apparatus of FIG. 4.

In S26, the lifting unit 55 is driven again to lower each support member 50 such that the height of each support portion 50a is lower than that of the stack SB as illustrated in the state ST24 of FIG. 25.

In S27, as exemplified in the state ST25 of FIG. 25, each support member 50 is moved to the support position by the moving unit 51. The support portion 50a of each support member 50 enters the stepped portion 132 of the tray 130 at the lowermost portion of the new stack SB. In S28, the lifting unit 55 is driven again to lift each support member 50. As a result, as illustrated in the state ST26 of FIG. 25, a new stack SB to which the tray 130 currently loaded is added is formed and lifted by each support member 50, and then the next tray 130 is loaded in the state ST26.

By repeating the above processing, the number of trays 130 of the stack SB can be increased by adding the trays 130 sequentially loaded to the lowermost portion of each stack SB. The processing of FIG. 23 can be the same processing even in a state where the tray 130 is not supported by the pair of support members 50 or in a state where one supported tray 130 is provided.

Figure 26:
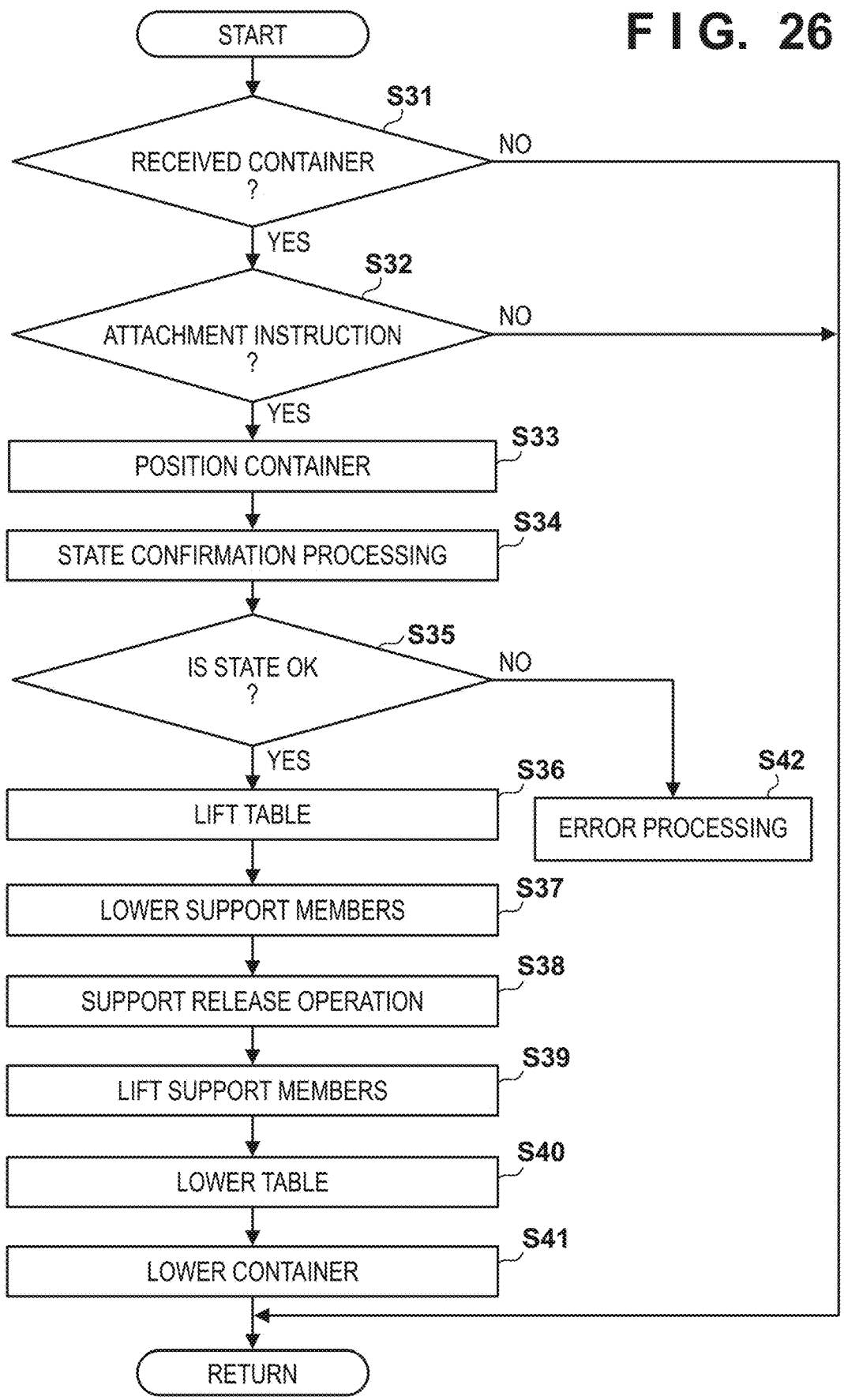
FIG. 26 is a flowchart illustrating a control example.

FIG. 26 is a flowchart illustrating another processing example executed by the processing unit 90. The processing example of FIG. 26 illustrates a processing example when the stack SB formed by stacking trays 130 through the processing of FIG. 23 is transferred from the accommodation portion 11 to the container 121 of the reception portion 10. This processing generally follows the reverse procedure of the processing of transferring the stack SB from the container 121 of the reception portion 10 to the accommodation portion 11 described with reference to FIGS. 13 to 19.

In S31, it is determined whether the empty container 121 (cart 120) in which the stack SB is not accommodated is received by the reception portion 10 based on the detection result of the sensor SR1. When it is determined as received, the processing proceeds to S32.

In S32, it is determined whether the worker has given an attachment instruction from the operation unit 94. When the attachment instruction has been given, the processing proceeds to S33, and the container 121 is positioned by the positioning unit 7. The plate cam 73 is rotated by driving of the motor 72 to lift the lifting member 74. The top portion of the lifting member 74 abuts on the flange portion 127 of the container 121 from below, the cart 120 is pushed up to the positioning position, and the cart 120 is separated from the floor FL. When the cart 120 is lifted, the abutment member 78 comes into sliding contact with the abutment member 123, which guides the pose of the cart 120 being lifted. Since the cart 120 is lifted by the lifting member 74 and separated from the floor FL, the influence from the floor FL is avoided, the positioning member 70 is fitted to the engagement portion 128 provided in the flange portion 127, and the container 121 is positioned and held in the reception portion 10. Up to this point, the processing is the same as S1 to S3 in FIG. 13 except for whether the stack SB is accommodated in the container 121.

In S34, state confirmation processing before the stack SB is transferred is executed. Here, for example, the detection result of the sensor SR2 is acquired, and it is determined whether the pair of conveyors 40 is located at the retraction position. When the pair of conveyors 40 is not located at the retraction position, the pair of conveyors is moved to the retraction position by the moving unit 45. The detection results of the sensors SR3 to SR5 are acquired, and it is confirmed whether the tray 130 is not present on the pair of conveyors 40, whether the tray 130 is present in the accommodation frame 6, and the like.

In S35, as a result of the state confirmation processing in S34, it is determined whether the state of the tray transport apparatus 1 is a state in which the stack SB can be transferred by the lifting table 30. For example, when it cannot be confirmed that the pair of conveyors 40 has moved to the retraction position or the like, it is determined that the tray cannot be transferred, and the processing proceeds to S42 to perform error processing. In the error processing, for example, the worker is notified that transfer is impossible or the host device 150 is notified that transfer is impossible. The error processing can also be regarded as a standby state in which the container 121 (cart 120) is held at the positioning position, and after the state in which transfer is impossible is released, the worker instructs restart from the operation unit 94, which causes the processing after S34 to be performed. The error processing can also be regarded as a reserved state for the next operation in which the container 121 (cart 120) is held at the positioning position, and the state in which transfer is impossible is released, whereby the processing after S4 is restarted.

When it is determined in S35 that the stack SB can be transferred, the processing proceeds to S36, and the lifting unit 31 is driven to lift the lifting table 30. The lifting table 30 is lifted to the same position as the state of FIG. 18. In S37, each support member 50 is lowered by the lifting unit 55, and the stack SB is placed on the lifting table 30. One stack SB is placed on each placement portion 30a of the lifting table 30. In S38, the moving unit 51 is driven to move each support member 50 to the release position. In S39, each support member 50 is lifted by the lifting unit 55.

In S40, the lifting unit 31 is driven to lower the lifting table 30. The lifting table 30 is lowered to the same position as the state of FIG. 17, and each stack SB is transferred from the accommodation portion 11 (specifically, in the accommodation frame 6) to the reception portion 10 (specifically, in the container 121). The two stacks SB moved from the accommodation frame 6 to the container 121 pass between the pair of conveyors 40 while being guided by the plurality of guide members 122a provided in the container 121 and the plurality of guide members 60 provided in the accommodation frame 6, and are placed on the placement member 122b of the container 121 from the accommodation portion 11. The two stacks SB passing between the pair of conveyors 40 from the accommodation frame 6 and being transferred to the container 121 have upper portions guided by the guide members 60 of the accommodation frame 6 and lower portions guided by the plurality of guide members 122a provided in the container 121. Thereafter, the lifting table 30 is separated from the stack SB placed on the placement member 122b, and moves to the bottom space 129 between the tray 130 at the lowermost portion of the stack SB and the bottom plate 121c, whereby the transfer of the stack SB is completed.

In S41, the lifting unit 71 is driven to lower the container 121 (cart 120) to the reception position. When the cart 120 lands on the floor FL, the lowering of the cart 120 is restricted, and when the lifting member 74 is separated from the flange portion 127 of the container 121, the container 121 (cart 120) is released from the positioning unit 7. Thereafter, the worker can take out the cart 120 (container 121) from the reception portion 10. The processing is thus completed. Since the processing of FIG. 23 can be started in a state where the container 121 (cart 120) to which the stack SB has been transferred is positioned in the reception portion 10, the container 121 is efficiently replaced. This makes it possible to continuously perform the collection of the tray 130 with the tray transport apparatus 1 without interruption.

OTHER EMBODIMENT

Figure 27:
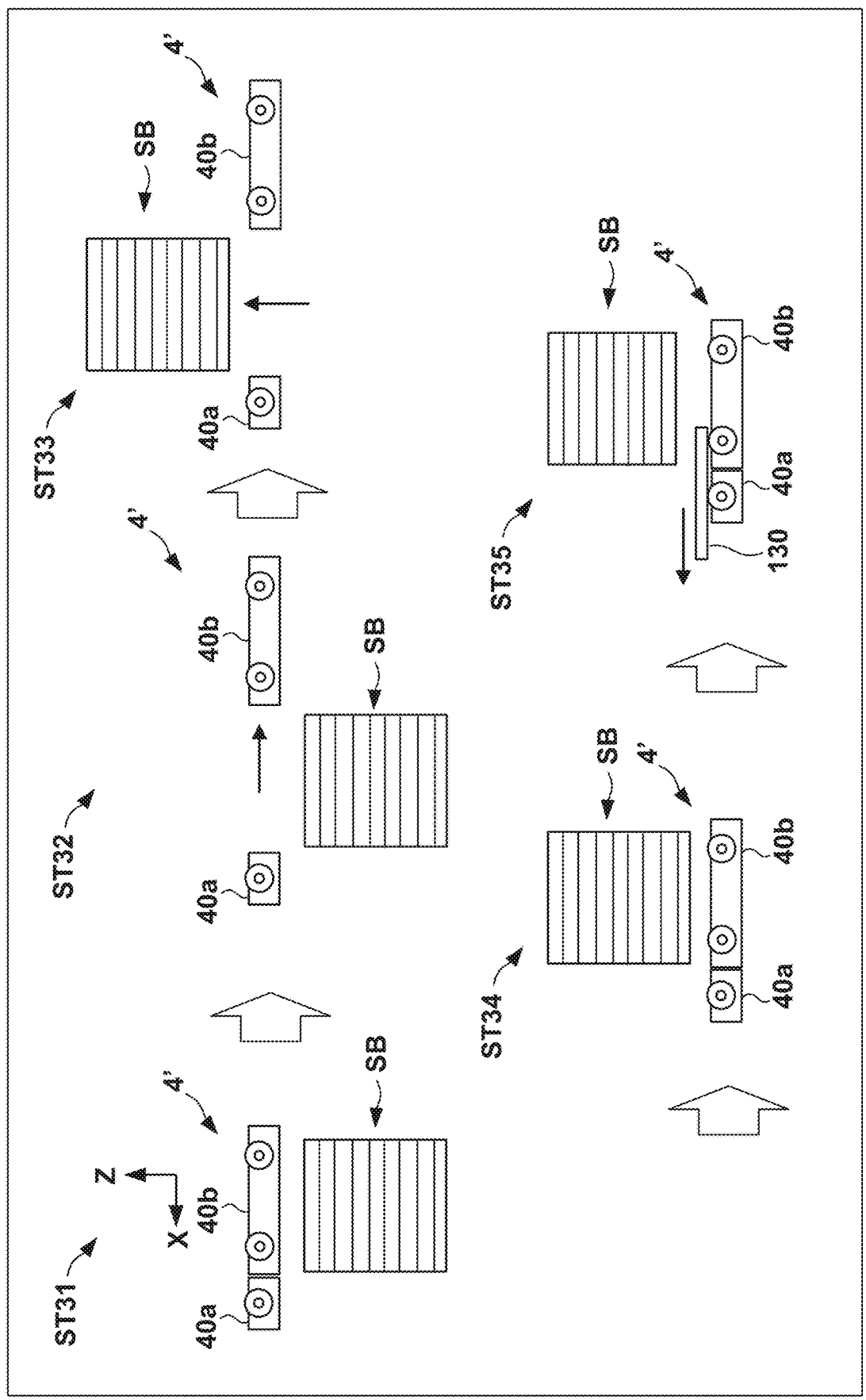
FIG. 27 is another operation explanatory diagram of the transport unit.

In the above embodiment, when the pair of conveyors 40 is moved to the transport position and the retraction position, the pair of conveyors is moved in the direction intersecting the transport direction of the tray 130, but other configurations can be adopted. FIG. 27 is a diagram schematically illustrating a transport unit 4' which is another configuration example of the transport unit 4.

The transport unit 4' includes a fixed conveyor 40a and a movable conveyor 40b, and the movable conveyor 40b is configured to be movable in the transport direction of the tray 130. Both the fixed conveyor 40a and the movable conveyor 40b are roller conveyors, and the fixed conveyor 40a has a structure with a small number of rollers.

In the state ST31, the movable conveyor 40b is located at the transport position. When the stack SB is transferred from the reception portion 10 to the accommodation portion 11, the movable conveyor 40b is moved to the retraction position as illustrated in the state ST32. As a result, as illustrated in the state ST33, the stack SB can pass between the fixed conveyor 40a and the movable conveyor 40b to be transferred from the reception portion 10 to the accommodation portion 11.

Thereafter, as illustrated in the states ST34 and ST35, the lowermost tray 130 of the stack SB can be unloaded.

While an embodiment has been described, the invention is not limited to the foregoing embodiments, and various variations/changes are possible within the spirit of the invention.

What is claimed is:

1. A tray transport apparatus comprising:
a reception portion configured to receive a container configured to accommodate a stack formed by stacking a plurality of trays;
an accommodation portion configured to accommodate the stack, the accommodation portion being disposed above the reception portion;
a transfer unit configured to lift the stack from the container to separate the stack from the container and transfer the stack to the accommodation portion;
a transport unit configured to unload a tray located at a lowermost portion of the stack accommodated in the accommodation portion; and
a housing forming an outer wall of the tray transport apparatus,
wherein
the housing includes:
a portion surrounding a space for receiving the container in the reception portion;
a portion surrounding a space for accommodating the stack in the accommodation portion;
a portion supporting the transfer unit;
a portion supporting the transport unit; and
an opening on a transport path of the tray to be transported by the transport unit.

2. A tray transport apparatus comprising:
a reception portion configured to receive a container configured to accommodate a stack formed by stacking a plurality of trays;
an accommodation portion configured to accommodate the stack, the accommodation portion being disposed above the reception portion;
a transfer unit configured to lift the stack from the container to separate the stack from the container and transfer the stack to the accommodation portion; and
a transport unit configured to unload a tray located at a lowermost portion of the stack accommodated in the accommodation portion,
wherein
the accommodation portion includes a plurality of first guide members extending in an up-down direction, the plurality of first guide members being configured to define an accommodation position of the stack,
the container includes a plurality of second guide members extending in the up-down direction, and
the stack is lifted by the transfer unit while being guided by the plurality of first guide members and the plurality of second guide members.

3. A tray transport apparatus comprising:
a reception portion configured to receive a container configured to accommodate a stack formed by stacking a plurality of trays;
an accommodation portion configured to accommodate the stack, the accommodation portion being disposed above the reception portion;
a transfer unit configured to lift the stack from the container to separate the stack from the container and transfer the stack to the accommodation portion;
a transport unit configured to unload a tray located at a lowermost portion of the stack accommodated in the accommodation portion;
a relay unit configured to relay transport of the tray between the transport unit and an external tray transport mechanism having a transport height different from a transport height of the transport unit; and
a lifting unit configured to lift and lower the relay unit between the transport height of the transport unit and the transport height of the external tray transport mechanism.

4. A tray transport apparatus comprising:
a reception portion configured to receive a container configured to accommodate a stack formed by stacking a plurality of trays;
an accommodation portion configured to accommodate the stack, the accommodation portion being disposed above the reception portion;
a transfer unit configured to lift the stack from the container to separate the stack from the container and transfer the stack to the accommodation portion; and
a transport unit configured to unload a tray located at a lowermost portion of the stack accommodated in the accommodation portion,
wherein
the transport unit includes:
at least one conveyor on which the tray is placed, the at least one conveyor being configured to transport the tray which is placed;
a moving unit configured to move the at least one conveyor between a transport position where the tray is transported, the transport position being a position in a transfer path of the stack to be transferred by the transfer unit, and a retraction position outside the transfer path;
a detection unit configured to detect a position of the at least one conveyor including the transport position and the retraction position; and
a control unit configured to control the transfer unit based on a detection result of the detection unit.

5. The tray transport apparatus according to claim 4, wherein
the transport unit includes a pair of conveyors as the at least one conveyer,
in the transport position, the pair of conveyors is located in the transfer path and is configured to transfer the tray, and
in the retraction position, the pair of conveyors is separated from each other, and the pair of conveyors is located outside the transfer path.

6. A tray transport apparatus comprising:
a reception portion configured to receive a container configured to accommodate a stack formed by stacking a plurality of trays;
an accommodation portion configured to accommodate the stack, the accommodation portion being disposed above the reception portion;
a transfer unit configured to lift the stack from the container to separate the stack from the container and transfer the stack to the accommodation portion;
a transport unit configured to unload a tray located at a lowermost portion of the stack accommodated in the accommodation portion;
a pair of support members on which the stack accommodated in the accommodation portion is placed;
a lifting unit configured to lift and lower the pair of support members; and
a moving unit configured to move the pair of support members between a support position where the stack is supported and a release position where the pair of support members is separated from each other and the stack is released, wherein the lifting unit is configured to lower the pair of support members to a position where the stack is placed on the transport unit.

7. The tray transport apparatus according to claim 6, further comprising:
a pair of support members on which the stack accommodated in the accommodation portion is placed;
a lifting unit configured to lift and lower the pair of support members; and
a moving unit configured to move the pair of support members between a support position where the stack is supported and a release position where the pair of support members is separated from each other and the stack is released,
wherein
the lifting unit is configured to lift and lower the pair of support members between a first height lower than a transport surface of the transport unit, a second height higher than the tray to be unloaded by the transport unit, and a third height higher than the second height, and
the lifting unit is configured to lower the pair of support members to a position where the stack is placed on the transport unit.

8. A tray transport apparatus comprising:
a reception portion configured to receive a container configured to accommodate a stack formed by stacking a plurality of trays;
an accommodation portion configured to accommodate the stack, the accommodation portion being disposed above the reception portion;
a transfer unit configured to lift the stack from the container to separate the stack from the container and transfer the stack to the accommodation portion; and
a transport unit configured to unload a tray located at a lowermost portion of the stack accommodated in the accommodation portion,
wherein
the reception portion includes:
a positioning unit configured to position the container; and
a lifting unit configured to lift and lower the container between a positioning position positioned by the positioning unit and a reception position below the positioning position.

9. The tray transport apparatus according to claim 8, wherein
the reception portion includes:
a guide member configured to guide reception of the container with respect to the reception portion in a first direction; and
an abutment member configured to abut on the container to position the container in the reception portion in the first direction.

10. A transfer system comprising:
a work transfer apparatus configured to transfer a work from a first tray to a second tray;
a work supply apparatus configured to supply the first tray supporting the work to the work transfer apparatus; and
a tray supply apparatus configured to supply the second tray to the work transfer apparatus,
wherein
the work supply apparatus includes:
a first reception portion configured to receive a first container configured to accommodate a first stack of a plurality of the first trays;
a first accommodation portion disposed above the first reception portion, the first accommodation portion being configured to accommodate the first stack;
a first transfer unit configured to lift the first stack from the first container to separate the first stack from the first container and transfer the first stack to the first accommodation portion; and
a first transport unit configured to unload the first tray located at a lowermost portion of the first stack accommodated in the first accommodation portion.

11. The transfer system according to claim 10, wherein the tray supply apparatus includes:
a second reception portion configured to receive a second container configured to accommodate a second stack of a plurality of the second trays;
a second accommodation portion disposed above the second reception portion, the second accommodation portion being configured to accommodate the second stack;
a second transfer unit configured to lift the second stack from the second container to separate the second stack from the second container and transfer the second stack to the second accommodation portion; and
a second transport unit configured to unload the second tray located at a lowermost portion of the second stack accommodated in the second accommodation portion.

12. The transfer system according to claim 11, further comprising:
a work collection apparatus configured to collect the second tray supporting the work from the work transfer apparatus; and
a tray collection apparatus configured to collect the first tray from the work transfer apparatus,
wherein
the work collection apparatus includes:
a third reception portion configured to receive a third container configured to accommodate a stack of a plurality of the second trays;
a third accommodation portion disposed above the third reception portion, the third accommodation portion being configured to accommodate a third stack of the plurality of the second trays;
a third transport unit configured to transport the second tray to be added to a lowermost portion of the third stack; and
a third transfer unit configured to lower the third stack accommodated in the third accommodation portion to transfer the third stack to the third container received in the third reception portion.

13. The transfer system according to claim 12, wherein the tray collection apparatus includes:
a fourth reception portion configured to receive a fourth container;
a fourth accommodation portion disposed above the fourth reception portion, the fourth accommodation portion being configured to accommodate a fourth stack of a plurality of the first trays;
a fourth transport unit configured to load a tray to be added to a lowermost portion of the fourth stack; and
a fourth transfer unit configured to lower the fourth stack accommodated in the fourth accommodation portion to transfer the fourth stack to the fourth container received in the fourth reception portion.

14. A tray transport apparatus comprising:
a reception portion configured to receive a container;
an accommodation portion disposed above the reception portion, the accommodation portion being configured to accommodate a stack formed by stacking a plurality of trays;
a transport unit configured to transport a tray to be added to a lowermost portion of the stack; and
a transfer unit configured to transfer the stack to the container received by the reception portion by lowering the stack accommodated in the accommodation portion.

15. The tray transport apparatus according to claim 14, wherein
the transport unit includes:
a pair of conveyors on which the tray is placed, the pair of conveyors being configured to transport the tray which is placed; and
a moving unit configured to move the pair of conveyors between a transport position and a retraction position,
in the transport position, the pair of conveyors is located in a transfer path of the stack to be transferred by the transfer unit and is configured to transport the tray, and
in the retraction position, the pair of conveyors is separated from each other, and the pair of conveyors is located outside the transfer path.

16. The tray transport apparatus according to claim 14, further comprising:
a pair of support members on which the stack accommodated in the accommodation portion is placed;
a lifting unit configured to lift and lower the pair of support members; and
a moving unit configured to move the pair of support members between a support position where the stack is supported and a release position where the pair of support members is separated from each other and the stack is released,
wherein the lifting unit is configured to lower the pair of support members to a position where the stack is placed on the transport unit.

17. The tray transport apparatus according to claim 14, further comprising:
a pair of support members on which the stack accommodated in the accommodation portion is placed;
a lifting unit configured to lift and lower the pair of support members; and
a moving unit configured to move the pair of support members between a support position where the stack is supported and a release position where the pair of support members is separated from each other and the stack is released,
wherein
the lifting unit is configured to lift and lower the pair of support members between a first height lower than a transport surface of the transport unit, a second height higher than the tray to be added to the lower most portion of the stack by the transport unit, and a third height higher than the second height, and
the lifting unit is configured to lower the pair of support members to a position where the stack is placed on the transport unit.

18. The tray transport apparatus according to claim 14, further comprising a housing forming an outer wall of the tray transport apparatus,
wherein
the housing includes:
a portion surrounding a space for receiving the container in the reception portion;
a portion surrounding a space for accommodating the stack in the accommodation portion;
a portion supporting the transfer unit;
a portion supporting the transport unit; and
an opening on a transport path of the tray to be transported by the transport unit.

19. The tray transport apparatus according to claim 14, wherein
the accommodation portion includes a plurality of first guide members extending in an up-down direction, the plurality of first guide members being configured to define an accommodation position of the stack,
the container includes a plurality of second guide members extending in the up-down direction, and
the stack is lowered by the transfer unit while being guided by the plurality of first guide members and the plurality of second guide members.

20. The tray transport apparatus according to claim 14, wherein the reception portion includes:
a positioning unit configured to position the container; and
a lifting unit configured to lift and lower the container between a positioning position positioned by the positioning unit and a reception position below the positioning position.

21. The tray transport apparatus according to claim 14, wherein the transport unit includes:
at least one conveyor on which the tray is placed, the at least one conveyor being configured to transport the tray which is placed;
a moving unit configured to move the at least one conveyor between a transport position where the tray is transported, the transport position being a position in a transfer path of the stack to be transferred by the transfer unit, and a retraction position outside the transfer path;
a detection unit configured to detect a position of the at least one conveyor including the transport position and the retraction position; and
a control unit configured to control the transfer unit based on a detection result of the detection unit.

* * * * *